United States Patent
Hai et al.

(10) Patent No.: US 11,410,452 B2
(45) Date of Patent: Aug. 9, 2022

(54) TEXTURE RECOGNITION DEVICE AND MANUFACTURING METHOD THEREOF, COLOR FILTER SUBSTRATE AND MANUFACTURING METHOD THEREOF

(71) Applicant: BOE TECHNOLOGY GROUP CO., LTD., Beijing (CN)

(72) Inventors: Xiaoquan Hai, Beijing (CN); Haisheng Wang, Beijing (CN); Lei Wang, Beijing (CN); Xue Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 136 days.

(21) Appl. No.: 16/766,826

(22) PCT Filed: May 21, 2019

(86) PCT No.: PCT/CN2019/087830
§ 371 (c)(1),
(2) Date: May 26, 2020

(87) PCT Pub. No.: WO2020/232637
PCT Pub. Date: Nov. 26, 2020

(65) Prior Publication Data
US 2021/0406505 A1       Dec. 30, 2021

(51) Int. Cl.
*G06V 40/13*       (2022.01)
*H04N 9/04*        (2006.01)
(Continued)

(52) U.S. Cl.
CPC .... *G06V 40/1318* (2022.01); *G02F 1/133512* (2013.01); *G02F 1/133516* (2013.01);
(Continued)

(58) Field of Classification Search
CPC ............ G06K 9/0004; G02F 1/133512; G02F 1/133516; G02F 1/13; G06F 3/0412;
(Continued)

(56) References Cited

U.S. PATENT DOCUMENTS

| 2008/0087803 A1* | 4/2008 | Yamamoto | H01L 31/14 250/226 |
| 2008/0121442 A1* | 5/2008 | Boer | G06F 3/0421 178/18.09 |

(Continued)

FOREIGN PATENT DOCUMENTS

| CN | 107065274 A | 8/2017 |
| CN | 108415188 A | 8/2018 |

(Continued)

OTHER PUBLICATIONS

International Search Report of PCT/CN2019/087830 in Chinese, dated Feb. 6, 2020.

(Continued)

*Primary Examiner* — Premal R Patel
(74) *Attorney, Agent, or Firm* — Collard & Roe, P.C.

(57) ABSTRACT

A texture recognition device and a manufacturing method of the texture recognition device, a color filter substrate and a manufacturing method of the color filter substrate are provided. The texture recognition device has a touch side, and includes: a light source array, a light valve structure and an image sensor array. The light valve structure includes a first substrate, a second substrate, and a light adjustment layer, and is configured to control a first region to be in a light transmission state in response to a control signal, so as to allow light emitted from the light source array to pass through the first region in the light transmission state to form a first photosensitive light source. The second substrate of the light valve structure is closer to the touch side than the (Continued)

first substrate, and the image sensor array is on the second substrate.

17 Claims, 10 Drawing Sheets

(51) Int. Cl.
    *G02F 1/1335*     (2006.01)
    *G06F 3/041*     (2006.01)
    *G09G 3/34*     (2006.01)
    *G09G 3/36*     (2006.01)

(52) U.S. Cl.
    CPC ......... *G06F 3/0412* (2013.01); *G09G 3/3426* (2013.01); *G09G 3/3611* (2013.01); *H04N 9/04551* (2018.08); *G09G 2354/00* (2013.01)

(58) Field of Classification Search
    CPC ............... G09G 3/3426; G09G 3/3611; G09G 2354/00; G09G 2320/0646; H04N 9/04551; G06V 40/1318
    See application file for complete search history.

(56) References Cited

U.S. PATENT DOCUMENTS

| | | | |
|---|---|---|---|
| 2012/0062817 A1* | 3/2012 | Kanbayashi | G02F 1/13338 349/61 |
| 2012/0133618 A1* | 5/2012 | Usukura | G02F 1/13338 345/175 |
| 2016/0358541 A1* | 12/2016 | Li | G06F 3/041 |
| 2017/0372113 A1* | 12/2017 | Zhang | G06K 9/2036 |
| 2018/0068166 A1 | 3/2018 | Zeng et al. | |
| 2018/0357462 A1* | 12/2018 | Mackey | G06K 9/00026 |
| 2019/0019000 A1* | 1/2019 | Lee | G02B 5/20 |
| 2020/0193126 A1 | 6/2020 | Shi et al. | |

FOREIGN PATENT DOCUMENTS

| | | |
|---|---|---|
| CN | 108828824 A | 11/2018 |
| CN | 109521590 A | 3/2019 |

OTHER PUBLICATIONS

Notice of Transmittal of the International Search Report of PCT/CN2019/087830 in Chinese, dated Feb. 6, 2020.
Written Opinion of the International Search Authority of PCT/CN2019/087830 in Chinese, dated Feb. 6, 2020.

\* cited by examiner

TEXTURE RECOGNITION DEVICE AND MANUFACTURING METHOD THEREOF, COLOR FILTER SUBSTRATE AND MANUFACTURING METHOD THEREOF

CROSS REFERENCE TO RELATED APPLICATIONS

This application is the National Stage of PCT/CN2019/087830 filed on May 21, 2019, the disclosure of which is incorporated by reference.

TECHNICAL FIELD

Embodiments of the present disclosure relate to a texture recognition device and a manufacturing method of the texture recognition device, a color filter substrate and a manufacturing method of the color filter substrate.

BACKGROUND

With increasing popularity of mobile terminals, more and more users use mobile terminals to perform operations such as identity verification, electronic payment and so on. Because of the uniqueness of skin textures such as fingerprint patterns or palm print patterns, fingerprint recognition technology combined with optical imaging is gradually adopted by mobile electronic devices for identity verification, electronic payment, etc. How to design a more optimized texture recognition device is a focus problem in the art.

SUMMARY

At least one embodiment of the present disclosure provides a texture recognition device, the texture recognition device has a touch side, and comprises a light source array, a light valve structure and an image sensor array; the light valve structure is on a side, close to the touch side, of the light source array, comprises a first substrate, a second substrate, and a light adjustment layer between the first substrate and the second substrate, and is configured to control a first region to be in a light transmission state in response to a control signal, so as to allow light emitted from the light source array to pass through the first region in the light transmission state to form a first photosensitive light source; the image sensor array is configured to receive light emitted from the light source array and then reflected to the image sensor array by a texture for a texture image collection; the second substrate of the light valve structure is closer to the touch side than the first substrate, and the image sensor array is on the second substrate.

For example, in the texture recognition device provided by at least one embodiment of the present disclosure, the light valve structure comprises a liquid crystal panel, the first substrate is an array substrate, the second substrate is an opposite substrate, and the light adjustment layer comprises a liquid crystal layer; the liquid crystal panel comprises a pixel array, the pixel array comprises a plurality of pixel units, the control signal comprises a scanning signal and a data signal, each of the pixel units comprises at least one sub-pixel unit, and each sub-pixel unit is configured to control a light transmission state of a pixel region corresponding to the each sub-pixel unit according to the scanning signal and the data signal.

For example, in the texture recognition device provided by at least one embodiment of the present disclosure, the image sensor array comprises a plurality of image sensors, and each of the plurality of image sensors is between pixel regions corresponding to adjacent pixel units of the plurality of pixel units.

For example, in the texture recognition device provided by at least one embodiment of the present disclosure, the image sensor array comprises a plurality of image sensors, and each of the plurality of image sensors is between pixel regions corresponding to adjacent sub-pixel units.

For example, in the texture recognition device provided by at least one embodiment of the present disclosure, the opposite substrate comprises a base substrate and a black matrix layer, and the image sensor array is between the base substrate and the black matrix layer; a side, away from the image sensor array, of the base substrate is closer to the touch side.

For example, in the texture recognition device provided by at least one embodiment of the present disclosure, the black matrix layer comprises a shielding region and a plurality of opening regions respectively exposing a plurality of sub-pixel units, a color filter pattern is provided in each of the opening regions, the color filter pattern is configured to form monochromatic light, an orthographic projection of each of the plurality of image sensors on the base substrate is within an orthographic projection of the shielding region on the base substrate.

For example, in the texture recognition device provided by at least one embodiment of the present disclosure, the opposite substrate further comprises a light filter pattern, and the light filter pattern is configured to filter light with a wavelength larger than 600 nm; each of the image sensors comprises a photosensitive component and a switch component, the light filter pattern is between the base substrate and the photosensitive component, and an orthographic projection of the light filter pattern on the base substrate at least partially overlaps with an orthographic projection of the photosensitive component on the base substrate.

For example, in the texture recognition device provided by at least one embodiment of the present disclosure, the light source array also serves as a backlight source of the light valve structure; or the texture recognition device further comprises a second light source array, and the second light source array serves as the backlight source of the light valve structure.

For example, in the texture recognition device provided by at least one embodiment of the present disclosure, the light source array comprises a plurality of sub-light sources and is configured to allow one sub-light source or multiple sub-light sources arranged continuously to be lit, so as to form the first photosensitive light source.

For example, in the texture recognition device provided by at least one embodiment of the present disclosure, the light valve structure is further configured to control a second region different from the first region to be in a light transmission state, so as to allow light emitted from the light source array to pass through the second region in the light transmission state to form a second photosensitive light source, and is configured to allow the first region and the second region to be in the light transmission state at same time or respectively at different time.

For example, in the texture recognition device provided by at least one embodiment of the present disclosure, in the case that the first region and the second region are in the light transmission state at the same time, an imaging range of the first photosensitive light source on the image sensor array is in a first ring shape, an imaging range of the second photosensitive light source on the image sensor array is in a second ring shape, and the first ring shape is tangent to the second ring shape.

For example, in the texture recognition device provided by at least one embodiment of the present disclosure, in the case that the first region and the second region are in the light transmission state respectively at different time, an imaging range of the first photosensitive light source on the image sensor array is in a first ring shape, an imaging range of the second photosensitive light source on the image sensor array is in a second ring shape, and the second ring shape covers a ring center of the first ring shape.

At least one embodiment of the present disclosure provides a manufacturing method of a texture recognition device, the texture recognition device has a touch side, and the manufacturing method comprises: providing a light source array; providing a light valve structure on a side, close to the touch side, of the light source array, in which the light valve structure comprises a first substrate, a second substrate, and a light adjustment layer between the first substrate and the second substrate, and the light valve structure is configured to control a first region to be in a light transmission state in response to a control signal, so as to allow light emitted from the light source array to pass through the first region in the light transmission state to form a first photosensitive light source; and providing an image sensor array, in which the image sensor array is configured to receive light emitted from the light source array and then reflected to the image sensor array by a texture for a texture collection, and the second substrate is closer to the touch side than the first substrate, and the image sensor array is on the second substrate.

For example, in the manufacturing method provided by at least one embodiment of the present disclosure, the light valve structure comprises a liquid crystal panel, the first substrate is an array substrate, the second substrate is an opposite substrate, and the light adjustment layer comprises a liquid crystal layer; providing the light valve structure comprises forming the opposite substrate of the liquid crystal panel, and forming the opposite substrate comprises: providing a base substrate; forming the image sensor array on the base substrate; and forming a black matrix layer on a side, away from the base substrate, of the image sensor array.

For example, in the manufacturing method provided by at least one embodiment of the present disclosure, forming the black matrix layer comprises: forming a shielding region and a plurality of opening regions respectively exposing a plurality of sub-pixel units, in which the shielding region is formed to cover the image sensor array.

For example, in the manufacturing method provided by at least one embodiment of the present disclosure, forming the opposite substrate further comprises: forming a color filter layer, in which the color filter layer is formed in a same layer as the black matrix layer, the color filter layer comprises a plurality of color filter patterns arranged in an array, and the plurality of color filter patterns are respectively formed in the plurality of opening regions.

For example, in the manufacturing method provided by at least one embodiment of the present disclosure, the image sensor array comprises a plurality of image sensors, each of the plurality of image sensors comprises a photosensitive component and a switch component, and forming the image sensor comprises: forming the switch component on the base substrate and forming the photosensitive component on the switch component.

For example, in the manufacturing method provided by at least one embodiment of the present disclosure, the switch component comprises a monocrystalline silicon thin film transistor, an oxide semiconductor thin film transistor, or a polycrystalline silicon thin film transistor.

For example, in the manufacturing method provided by at least one embodiment of the present disclosure, forming the photosensitive component on the switch component comprises: sequentially forming a first electrode of the photosensitive component, a semiconductor layer of the photosensitive component and a second electrode of the photosensitive component, in which the first electrode is electrically connected to a source electrode of the switch component or a drain electrode of the switch component; forming a first insulation layer to cover the switch component, in which the first insulation layer comprises a first opening exposing the second electrode; and forming a first trace on the first insulation layer, in which the first trace is electrically connected to the second electrode through the first opening.

For example, the manufacturing method provided by at least one embodiment of the present disclosure further comprises: forming a shielding layer on the photosensitive component.

For example, in the manufacturing method provided by at least one embodiment of the present disclosure, forming the switch component comprises: sequentially forming a gate electrode, a gate insulation layer, an active layer, a source electrode and a drain electrode of a switch transistor on the base substrate, and forming a second insulation layer, in which the second insulation layer comprises a second opening exposing the source electrode or the drain electrode, and the first electrode of the photosensitive component is electrically connected to the source electrode or the drain electrode through the second opening.

For example, in the manufacturing method provided by at least one embodiment of the present disclosure, forming the switch component comprises: sequentially forming a shielding pattern and a buffer layer on the base substrate, in which the buffer layer covers the shielding pattern; sequentially forming an active layer, a gate insulation layer, a gate electrode, an interlayer insulation layer, a source electrode and a drain electrode of a switch transistor on the buffer layer, in which the gate insulation layer and the interlayer insulation layer are provided with a first via hole and a second via hole which expose the active layer, the source electrode and the drain electrode are electrically connected to the active layer respectively through the first via hole and the second via hole, and an orthographic projection of the active layer on the base substrate at least partially overlaps with an orthographic projection of the shielding pattern on the base substrate; the first electrode of the photosensitive component is electrically connected to the source electrode or the drain electrode.

At least one embodiment of the present disclosure provides a color filter substrate, the color filter substrate comprises a base substrate, a color filter layer and an image sensor array; the image sensor array is configured to receive light emitted from a light source array and then reflected to the image sensor array by a texture for a texture collection; the color filter layer comprises a plurality of color filter patterns arranged in an array, the image sensor array comprises a plurality of image sensors, and an orthographic projection of each of the image sensors on the base substrate is within an orthographic projection of an interval between adjacent color filter patterns of the plurality of color filter patterns on the base substrate.

For example, the color filter substrate provided by at least one embodiment of the present disclosure further comprises a black matrix layer; the black matrix layer is in a same layer as the color filter layer, the black matrix layer comprises a shielding region and a plurality of opening regions arranged in an array, and the plurality of color filter patterns are respectively in the plurality of opening regions, so that an orthographic projection of each of the plurality of image sensors on the base substrate is within an orthographic projection of the shielding region on the base substrate; the image sensor array is between the base substrate and the shielding region.

At least one embodiment of the present disclosure provides a manufacturing method of a texture recognition device, comprising: providing a base substrate; forming an image sensor array, in which the image sensor array is configured to receive light emitted from a light source array and then reflected to the image sensor array by a texture for a texture collection, and the image sensor array comprises a plurality of image sensors; and forming a color filter layer, in which the color filter layer comprises a plurality of color filter patterns arranged in an array; an orthographic projection of each of the image sensors on the base substrate is within an orthographic projection of an interval between adjacent color filter patterns of the plurality of color filter patterns on the base substrate.

For example, the manufacturing method provided by at least one embodiment of the present disclosure further comprises forming a black matrix layer, in which the black matrix layer is formed in a same layer as the color filter layer, the black matrix layer comprises a shielding region and a plurality of opening regions arranged in an array, and the plurality of color filter patterns are respectively formed in the plurality of opening regions, so that an orthographic projection of each of the plurality of image sensors on the base substrate is within an orthographic projection of the shielding region on the base substrate; the image sensor array is formed between the base substrate and the shielding region.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the present disclosure and thus are not limitative of the present disclosure.

DETAILED DESCRIPTION

Figure 1A:
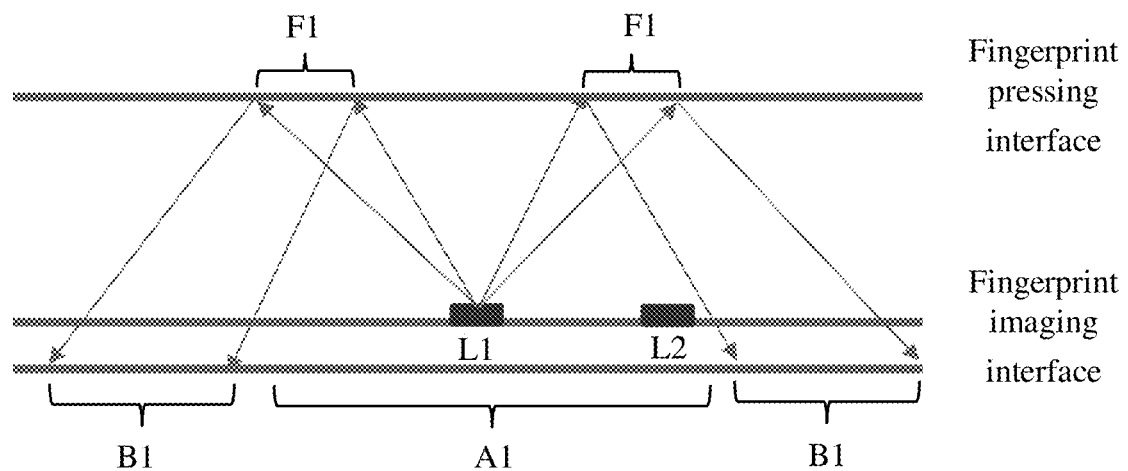
FIG. 1A is a schematic diagram of the principle of fingerprint imaging.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various under-screen texture recognition function components. The terms "comprise," "comprising," "include,"

"including," etc., are intended to specify that the elements or the objects stated before these terms encompass the elements or the objects and equivalents thereof listed after these terms, but do not preclude the other elements or objects. The phrases "connect" or "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

At present, the narrow border is gradually becoming a mainstream for the design and manufacture of a display device, especially for a portable display device such as a mobile phone. One means to realize the narrow border is to integrate image sensors with a fingerprint recognition function into a display device, so as to realize a fingerprint recognition mode under the screen and increases an area of a display region of the display device, and thus increasing the screen proportion.

For example, a point light source, a line light source or a light source with a certain pattern, etc. can be used as a photosensitive light source of an image sensor for fingerprint recognition. In addition, the light source and the image sensor may be arranged in various ways, for example, the light source may be arranged on a side of the image sensor close to the fingerprint touch side, or the light source may be arranged on a same plane as the image sensor, or the light source may also be arranged on a side of the image sensor away from the fingerprint touch side. The arranging modes of the light source and the image sensor can be selected according to different requirements.

The principle of fingerprint recognition is described in the following by taking the case that a point light source is taken as the photosensitive light source of the image sensor, and the light source is arranged on the side of the image sensor close to the fingerprint touch side as an example, but this does not limit the embodiments of the present disclosure.

In a reflective optical fingerprint recognition device, in a fingerprint recognition process, as illustrated in FIG. 1A, when a point light source L1 emits light, the light emitted by the point light source L1 irradiates a fingerprint pressing interface (e.g., an outer surface of a glass screen) at different angles, because of total reflection on the fingerprint pressing interface, a part of the light whose incident angle is larger than or equal to the critical angle θ of the total reflection undergoes total reflection, which results in that this part of the light is not able to exit from the fingerprint pressing interface, thus generating a total reflection region. Correspondingly, a part of the light whose incident angle is smaller than the critical angle θ of the total reflection exits from the fingerprint pressing interface. Therefore, a texture image can be collected by light reflected by the total reflection region, for example, a clear texture image is formed at a region B1 of the fingerprint imaging interface where the image sensor is located, the texture image corresponds to a part of the fingerprint at a region F1, the region F1 is the total reflection region, and the region B1 is an imaging region.

Specifically, for example, when a fingerprint of a user's finger presses the total reflection region F1, ridges of the fingerprint touch a surface of the total reflection region F1, so that the total reflection condition of positions corresponding to the ridges of the fingerprint is destroyed, and therefore light exits at the corresponding positions, so that an original reflection path is changed, while valleys of the fingerprint do not touch the surface of the total reflection region F1, so that the total reflection condition of positions corresponding to the valleys of the fingerprint is not destroyed, and light is still totally reflected at the corresponding positions, and thus the original reflection path is not changed. In this way, the light in the total reflection region causes light incident on the fingerprint imaging interface to form a texture image with alternate bright and dark portions at different positions because of the different influences of the valleys and the ridges of the fingerprint on the total reflection condition.

In addition, because of the interference caused by the light emitted out from the fingerprint pressing interface and then reflected by fingerprints or the like, or because the light emitted by the light source is reflected to the fingerprint imaging interface by other functional layers before reaching the fingerprint pressing interface, a region A1 of the fingerprint imaging interface becomes an invalid detection region, and an effective texture image cannot be formed in this region. In the invalid region A1, a part of the light emitted by the light source L1 and then reflected to the fingerprint imaging interface by other functional layers before reaching the fingerprint pressing interface and a part of the light emitted by the light source L1 that is almost vertically reflected by the fingerprint pressing interface have higher brightness and are basically in a center of the invalid region A1, and therefore a highlight region is formed. Because the highlight region has a higher brightness, a larger photoelectric signal is generated in a part of the image sensor array corresponding to the highlight region, which is easy to form a residual image, thus the highlight region is also known as a residual image region.

Figure 1B:
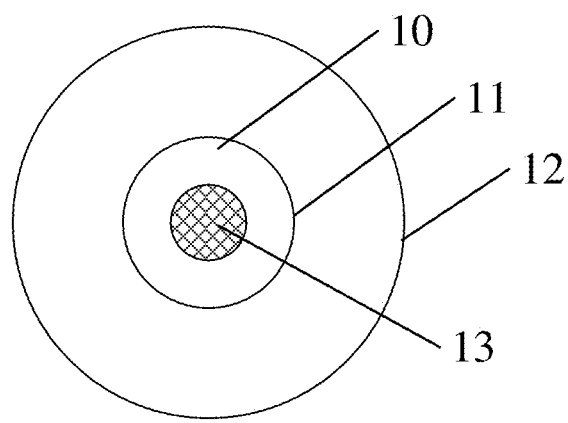
FIG. 1B is a schematic diagram of an imaging range of a point light source.

For example, FIG. 1B illustrates a schematic diagram of an imaging range of a point light source. As illustrated in FIG. 1B, in a photosensitive range of the point light source, an effective imaging range is in a ring shape, that is, in FIG. 1B, a ring region between an inner circle 11 and an outer circle 12 is the effective imaging range which corresponds to the imaging region B1 corresponding to the total reflection region F1 in FIG. 1A; a region (hereinafter referred to as a ring center 10) within the inner circle 11 of the ring shape is the invalid imaging region, which corresponds to the invalid region A1 in FIG. 1A; a part of the region (the shaded region) 13 inside the ring center 10 is the highlight region (residual image region), and it is easy to cause a residual image in the highlight region by the image sensor array during imaging.

Figure 1C:
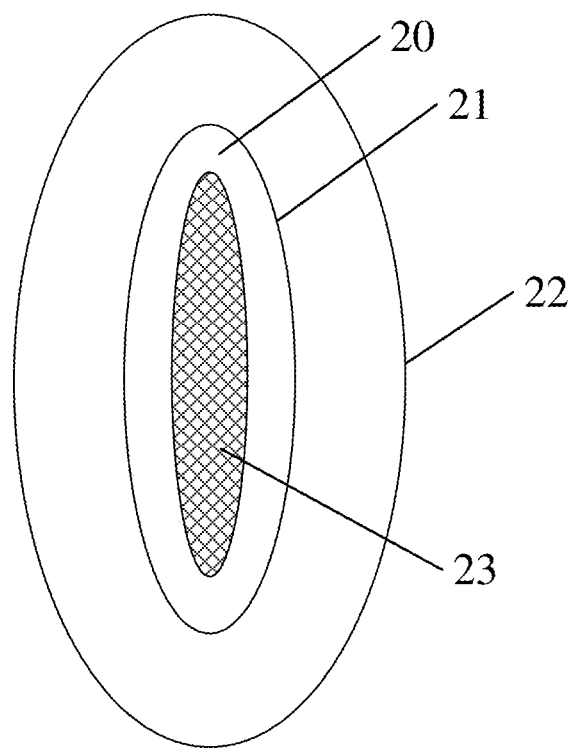
FIG. 1C is a schematic diagram of an imaging range of a line light source.

Similarly, FIG. 1C shows a diagram of an imaging range of a line light source. As illustrated in FIG. 1C, the effective imaging range of a line light source is a racetrack-shaped ring region or a long oval-shaped ring region between an inner circle 21 and an outer circle 22, a ring center 20 is the invalid imaging region, and a part of the region (the shaded region) 23 inside the ring center 10 is the highlight region (residual image region) that is easy to cause a residual image by the image sensor array during imaging.

At present, a display panel of a display device (e.g., mobile phone, etc.) adopting the under-screen fingerprint recognition is usually a self-luminous display panel such as an organic light emitting diode (OLED) display panel, a quantum dot light emitting diode (QLED) display panel, or the like. For a non-self-luminous display panel such as a liquid crystal display panel (LCD) that relies on light emitted from a backlight source to achieve display, because of the differences in the structure and the display mode, arrangements of the image sensors need to be adjusted accordingly.

At least one embodiment of the present disclosure provides a texture recognition device, the texture recognition device has a touch side and comprises a light source array, a light valve structure and an image sensor array; the light valve structure is on a side of the light source array close to the touch side, and comprises a first substrate, a second substrate, and a light adjustment layer between the first substrate and the second substrate, and the light valve structure is configured to control a first region to be in a light transmission state in response to a control signal, so as to allow light emitted from the light source array to pass through the first region in the light transmission state to form a first photosensitive light source; the image sensor array is configured to receive light emitted from the light source array and then reflected to the image sensor array by a texture for a texture collection. The second substrate of the light valve structure is closer to the touch side than the first substrate, and the image sensor array is on the second substrate.

At least one embodiment of the present disclosure provides a color filter substrate, and the color filter substrate comprises a base substrate, a color filter layer and an image sensor array; the image sensor array is configured to receive light emitted from a light source array and then reflected to the image sensor array by a texture for a texture collection; the color filter layer comprises a plurality of color filter patterns arranged in an array, the image sensor array comprises a plurality of image sensors, and an orthographic projection of each of the image sensors on the base substrate is within an orthographic projection of an interval between adjacent color filter patterns of the plurality of color filter patterns on the base substrate.

In the following, the texture recognition device and the manufacturing method of the texture recognition device, the color filter substrate and the manufacturing method of the color filter substrate provided by the embodiments of the present disclosure are described in detail with reference to the accompanying drawings.

Figure 2:
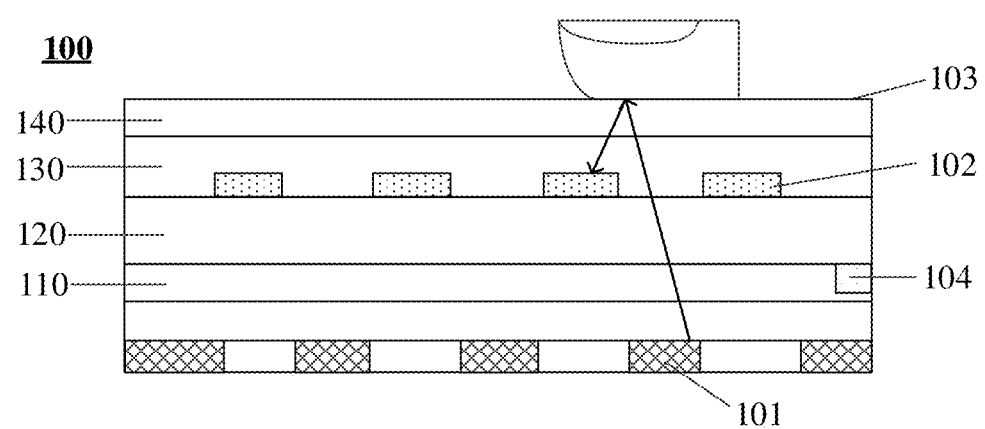
FIG. 2 is a cross-sectional view of a texture recognition device provided by at least one embodiment of the present disclosure.

For example, FIG. 2 is a schematic cross-sectional view of a texture recognition device provided by at least one embodiment of the present disclosure. As illustrated in FIG. 2, a texture recognition device 100 includes a light source array, an image sensor array, and a light valve structure. The light source array includes a plurality of sub-light sources 101, and the plurality of sub-light sources 101 are arranged in an array within a predetermined region. The image sensor array includes a plurality of image sensors 102, and the plurality of image sensors 102 are arranged in an array within a predetermined region. The image sensor array is configured to receive light emitted from the light source array and then reflected to the image sensor array by a texture for a texture collection.

The texture recognition device 100 has a touch side 103, the light valve structure is disposed on a side, close to the touch side, of the light source array, and comprises a first substrate 110, a second substrate 130, and a light adjustment layer 120 between the first substrate 110 and the second substrate 130. The light valve structure is configured to control a first region to be in a light transmission state in response to a control signal, so as to allow light emitted from the light source array to pass through the first region in the light transmission state to form a first photosensitive light source. The second substrate 130 of the light valve structure is closer to the touch side 103 than the first substrate 110, and the image sensor array is arranged on the second substrate 130. Therefore, in a manufacturing process of the texture recognition device, a manufacturing process of the image sensor array and a manufacturing process of the second substrate 130 can be combined together to improve the integration level of the device, which is more beneficial to the realization of light and thin design.

For example, when an operator having a texture such as a finger touches a surface of the touch side 103 of the texture recognition device 100, the light emitted by the sub-light sources 101 is reflected by the operator and then reaches the image sensors 102, and the image sensors 102 collect texture images of the operator. For example, the operator having the texture may be a hand, in this case, the texture recognized by the image sensors 102 is a skin texture, such as a fingerprint, a palm print, etc. In addition, the operator having the texture may also be non-living bodies with a certain texture, such as objects with a certain texture made of materials such as resin and the like, and no limitation is imposed to this in the embodiments of the present disclosure.

For example, the light valve structure comprises a structure which can realize different light transmittances at different positions under control, such as a liquid crystal light valve, an electrochromic light valve, an electronic ink light valve and the like. For example, in the case where the light valve structure is the liquid crystal light valve, the light adjustment layer 120 of the light valve structure includes a liquid crystal material, and at least one selected from a group consisting of the first substrate 110 and the second substrate 130 includes a plurality of electrodes configured to drive the liquid crystal material at different positions to deflect, so that the liquid crystal material can be correspondingly deflected by applying different voltages to the electrodes, so as to change the light transmittance of the liquid crystal light valve and realize the function of light valve. For example, a light incident side of the liquid crystal light valve (a side close to the light source array) is provided with a first polarizer and a light exit side of the liquid crystal light valve is provided with a second polarizer, and the polarization direction of the first polarizer and the polarization direction of the second polarizer are perpendicular to each other. Combined with the first polarizer and the second polarizer, for example, when the molecular alignment direction of the liquid crystal material is parallel to the propagation direction of light, the liquid crystal light valve at the corresponding position transmits light, and when the molecular alignment direction of the liquid crystal material is perpendicular to the propagation direction of light, the liquid crystal light valve at the corresponding position does not transmit light.

For example, in the case where the light valve structure is the electrochromic light valve, the light adjustment layer 120 of the light valve structure includes an electrochromic material, and at least one selected from a group consisting of the first substrate 110 and the second substrate 130 includes a plurality of electrodes configured to drive the electrochromic material at different positions to change color, so that the color of the electrochromic material can be changed by applying different voltages to the electrodes, so as to change the light transmittance of the electrochromic light valve and realize the function of light valve. For example, the electrochromic material can be driven by different voltages to change between a transparent state and a dark state. When the electrochromic material is in the transparent state, the corresponding position transmits light, and when the electrochromic material is in the dark state, the corresponding position does not transmit light.

For example, in the case where the light valve structure is the electronic ink light valve, the light adjustment layer 120 of the light valve structure includes an electronic ink layer (e.g., including electronic ink microcapsules), and at least one selected from a group consisting of the first substrate 110 and the second substrate 130 includes a plurality of electrodes configured to drive micro-particles (e.g., black particles) in the electronic ink layer to move, so that particles in the electronic ink can move by applying different voltages to the electrodes to change the light transmittance of the electronic ink layer and realize the function of light valve. For example, the electronic ink layer can be driven by different voltages to change between a transparent state and a dark state. When the electronic ink layer is in the transparent state, the corresponding position transmits light, and when the electronic ink layer is in the dark state, the corresponding position does not transmit light.

Figure 3A:
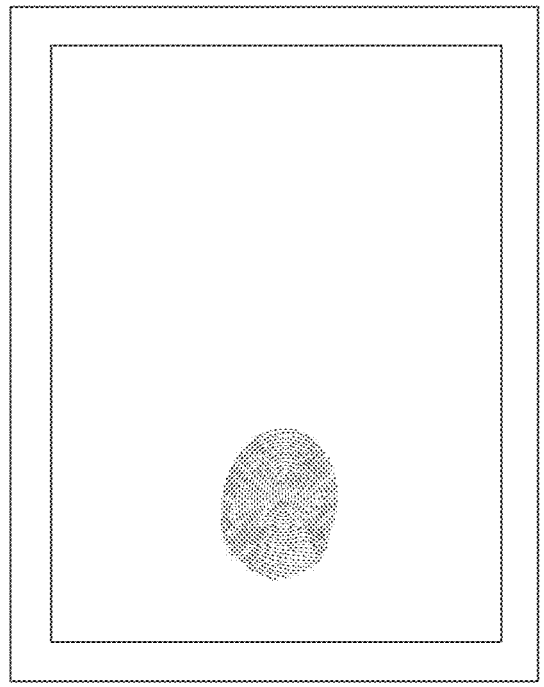
FIG. 3A is a schematic diagram of a texture recognition device touched by a texture provided by at least one embodiment of the present disclosure.
Figure 3B:
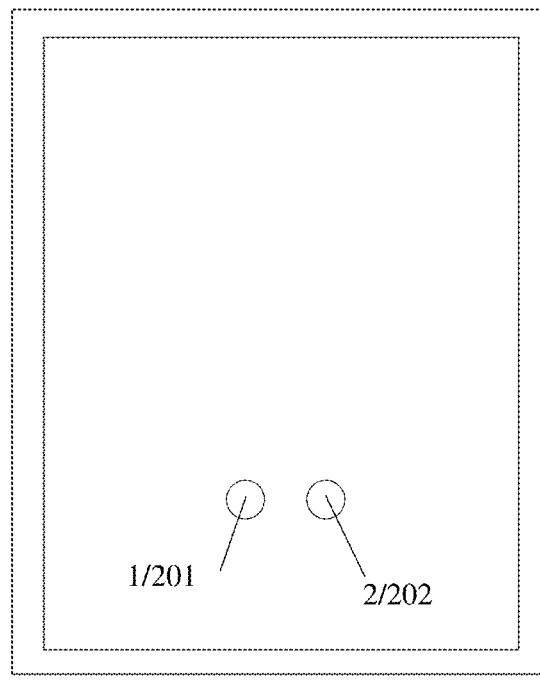
FIG. 3B is a schematic diagram of a photosensitive light source formed by a texture recognition device provided by at least one embodiment of the present disclosure.

The operation process of the texture recognition device 100 is as follows. In the process of an operator having a texture such as an operator's finger touching the touch side 103 of the texture recognition device 100, as illustrated in FIG. 3A, the texture recognition device 100 starts the texture collection. In the process of the texture collection performed by the texture recognition device 100, as illustrated in FIG. 3B, the light valve structure controls the first region 1 to be in a light transmission state in response to the control signal, so as to allow the light emitted from the light source array to pass through the first region 1 to form a first photosensitive light source 201.

For example, in some embodiments, as illustrated in FIG. 2, the texture recognition device 100 further includes a controller 104, and the controller may be directly mounted on the texture recognition device 100 or communicate (in signal connection) with the texture recognition device 100 through, for example, a flexible printed circuit board (FPC). As illustrated in FIG. 3A and FIG. 3B, for example, in at least one embodiment, the controller 104 can determine the position of the first region 1 according to a touch position of the texture on the touch side 103, and control the light valve structure to allow the first region 1 to be in the light transmission state, so as to provide the first photosensitive light source 201.

For example, the first photosensitive light source 201 includes one or more sub-light sources 101. For example, the controller 104 is further configured to acquire a touch area of the texture on the touch side 103 to determine the size of the first region 1 and the number of the first region 1, thereby also determining the number of sub-light sources 101 corresponding to the first region 1 (i.e., the number of sub-light sources 101 included in the first photosensitive light source 201) and the number of first photosensitive light sources 201 (described in detail later). For example, the texture recognition device 100 further includes a touch structure, and the touch position and the touch area of the texture on the touch side 103 may be obtained by the touch structure.

For example, the touch structure may be disposed on a side, close to the image sensor array, of a cover plate 140, or may be disposed on a side, away from the image sensor array, of the cover plate 140. For example, the touch structure includes a plurality of touch electrodes, for example, the touch structure is implemented as a touch structure of the self-capacitance type or a touch structure of the mutual capacitance type. For example, in the case where the touch structure is of the self-capacitance type, the touch structure includes a plurality of block touch electrodes arranged in an array; in the case where the touch control structure is of the mutual capacitance type, the touch control structure includes a plurality of strip-shaped drive electrodes and strip-shaped sense electrodes which are arranged crosswise. The embodiments of the present disclosure do not specifically limit the form and structure of the touch structure.

For example, referring to FIG. 2, the texture recognition device 100 further includes the cover plate 140, for example, the cover plate 140 is a glass cover plate which can encapsulate and protect the texture recognition device 100. For example, a surface of the cover plate 140 is the touch side 103. When an operator with a texture such as a finger touches the touch side 103 of the texture recognition device 100, the light emitted by the sub-light sources 101 can be reflected by the operator and reach the image sensors 102, and the image sensors 102 can collect texture images of the operator.

Figure 4:
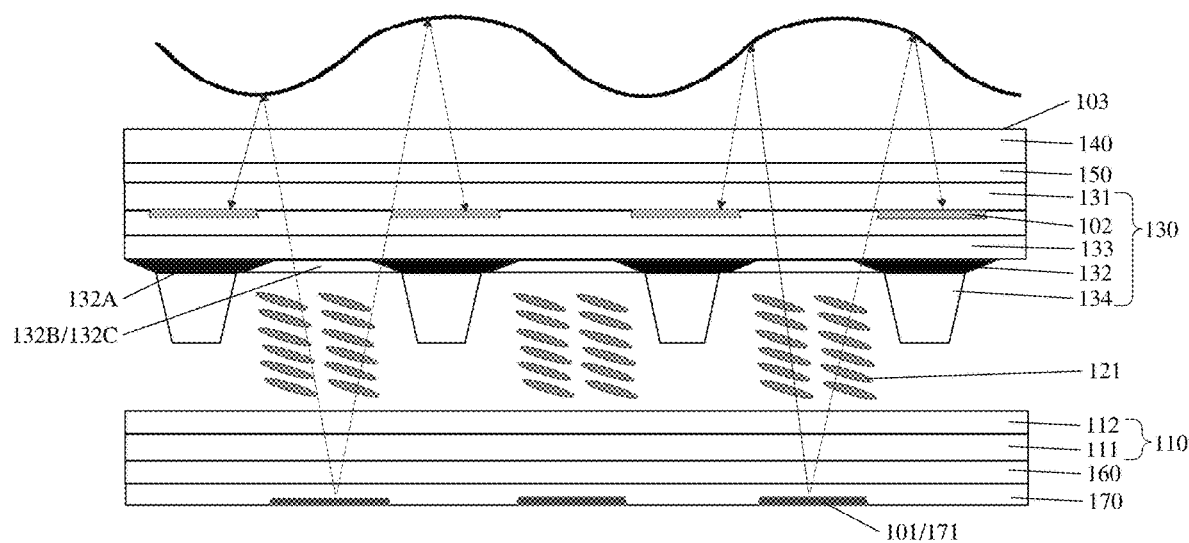
FIG. 4 is a schematic cross-sectional view of a liquid crystal display device provided by at least one embodiment of the present disclosure.

For example, in some embodiments, as illustrated in FIG. 4, the light valve structure is a liquid crystal panel. In this case, the texture recognition device 100 is implemented as a liquid crystal display device. The following description takes the liquid crystal panel as an example of the light valve structure, but the embodiments of the present disclosure are not limited to this.

Figure 6A:
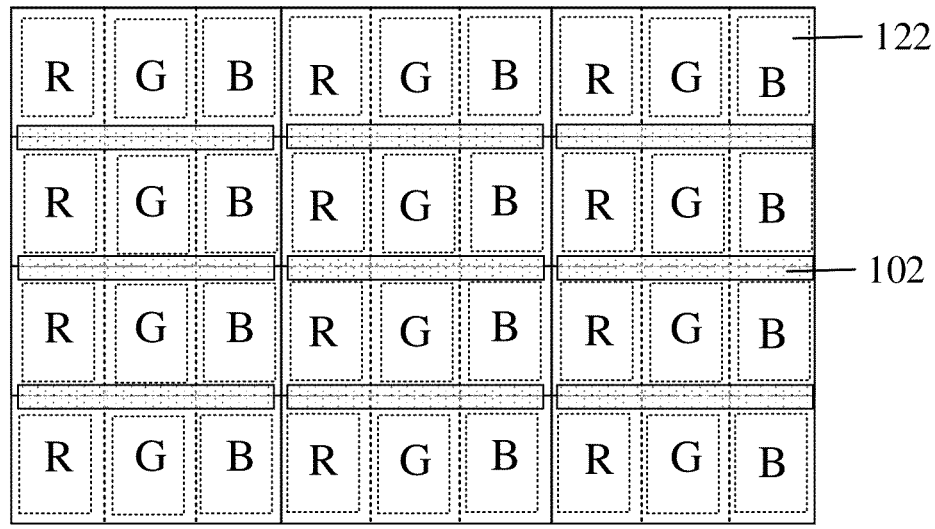
FIG. 6A is a schematic diagram showing an arrangement of a pixel array and image sensors in a liquid crystal display device provided by at least one embodiment of the present disclosure.

As illustrated in FIG. 4, in the liquid crystal panel, the first substrate 110 is an array substrate, the second substrate 130 is an opposite substrate, the light adjustment layer 120 includes the liquid crystal layer, and the liquid crystal layer includes the liquid crystal material 121. The liquid crystal panel includes a pixel array, for example, FIG. 6A shows a schematic planar view of a pixel array. As illustrated in FIG. 6A, the pixel array includes a plurality of pixel units, each of the pixel units includes at least one sub-pixel unit (illustrated as three sub-pixel units R, G, B in the figure), the control signal includes a scanning signal and a data signal, and each sub-pixel unit is configured to control a light transmission state of a pixel region corresponding to the sub-pixel unit according to the scanning signal and the data signal. For example, the first region 1 includes a pixel region 122 corresponding to at least one sub-pixel unit.

For example, in some embodiments, each of the plurality of image sensors 102 included in the image sensor array is between pixel regions 122 corresponding to adjacent pixel units of the plurality of pixel units.

For example, in some examples, a distance between the pixel regions 122 corresponding to two adjacent rows of the pixel units is larger a distance between the pixel regions 122 corresponding to two adjacent columns of the pixel units. In this case, in order to facilitate the arrangement of the device, the image sensors 102 may be disposed between the pixel regions 122 corresponding to two adjacent rows of pixel units. For example, as illustrated in FIG. 6A, each of the pixel units of the liquid crystal panel includes a plurality of sub-pixel units (illustrated as three sub-pixel units of R, G and B), each image sensor 102 is disposed between pixel regions 122 corresponding to two adjacent rows of the pixel units, and one image sensor 102 is disposed between the pixel regions 122 corresponding to every two adjacent pixel units (in this case, the pixel region corresponding to each pixel unit includes pixel regions 122 corresponding to the three sub-pixel units of R, G and B), for example.

For example, in some embodiments, each of the plurality of image sensors 102 included in the image sensor array is between pixel regions 122 corresponding to adjacent sub-pixel units.

For example, in some examples, each pixel unit includes a red sub-pixel unit R, a green sub-pixel unit G, and a blue sub-pixel unit B. In this case, each image sensor may be disposed between the pixel regions 122 corresponding to two adjacent red sub-pixel units R, or between the pixel regions 122 corresponding to two adjacent green sub-pixel units G, or between the pixel regions 122 corresponding to two adjacent blue sub-pixel units B.

Figure 6B:
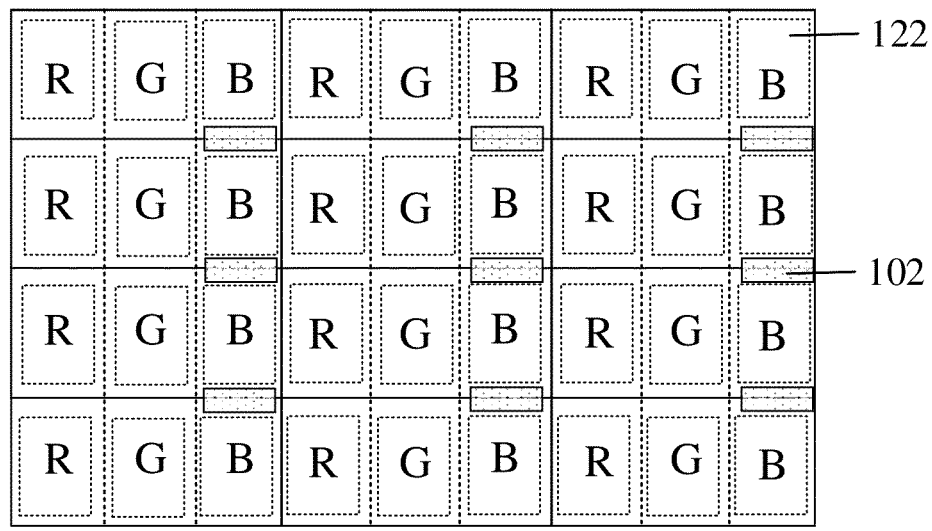
FIG. 6B is a schematic diagram showing another arrangement of a pixel array and image sensors in a liquid crystal display device provided by at least one embodiment of the present disclosure.

For example, in one example, compared to the red color sub-pixel unit R and the green sub-pixel unit G, the blue sub-pixel unit B has the smallest influence on the display effect of the liquid crystal panel, and in this case, the image sensor 102 may be disposed between the pixel regions 122 corresponding to the blue sub-pixel units B respectively of two adjacent pixel units. For example, as illustrated in FIG. 6B, one image sensor 102 is provided between the pixel regions 122 corresponding to blue sub-pixel units B of every two adjacent pixel units. In this case, the effective light emitting area of the blue sub-pixel unit B may be designed to be relatively small, or in the case where the image sensor 102 is formed between the pixel regions 122 corresponding to the blue sub-pixel units B respectively of adjacent pixel units in the manufacturing process, even if the structural arrangement of the blue sub-pixel unit B is affected, the display effect of the liquid crystal panel cannot be affected.

For example, in some examples, the image sensors 102 may be disposed between the pixel regions 122 corresponding to two adjacent columns of pixel units or between pixel regions 122 corresponding to two adjacent columns of sub-pixel units. For example, in some examples, one row of image sensors may be provided between the pixel regions 122 corresponding to two adjacent rows of pixel units, or two rows of image sensors may be provided between the pixel regions 122 corresponding to two adjacent rows of pixel units, or no image sensor is provided between the pixel regions 122 corresponding to a part of the adjacent two rows of pixel units. The embodiments of the present disclosure do not specifically limit the number, the arrangement mode or the like of the image sensors.

In addition, it should be noted that the above definitions of the rows and the columns are interchangeable. For example, when the liquid crystal panel in the figure rotates in the plane where the liquid crystal panel is located, the rows and the columns of the pixel array also change accordingly.

For example, in some embodiments, as illustrated in FIG. 4, the opposite substrate includes a base substrate 131 and a black matrix layer 132, the image sensor array is disposed between the base substrate 131 and the black matrix layer 132, and a side, away from the image sensor array, of the base substrate 131 (illustrated as the upper side in the figure) is closer to the touch side 103. Alternatively, in some embodiments, the image sensor array may be disposed on a side, away from the black matrix layer, of the base substrate.

For example, the black matrix layer 132 includes a shielding region 132A and a plurality of opening regions 132B respectively exposing the plurality of sub-pixel units, and a color filter pattern 132C is provided in each of the opening regions 132B for forming monochromatic light, such as red light, green light, blue light, and the like, thereby forming sub-pixel units that can emit light of different colors. For example, an orthographic projection of each image sensor 102 on the base substrate 131 is within an orthographic projection of the shielding region 132A on the base substrate 131. Therefore, the arrangement of the image sensors 102 cannot affect the display effect of the liquid crystal display device, and the shielding region 132A can also block a part of the light emitted from the light source array, so as to prevent the light emitted from the light source array from directly entering the image sensor 102 and affecting the collection of texture images.

It should be noted that in the embodiments of the present disclosure, the opposite substrate may not be provided with the black matrix layer, or may not be provided with the color filter layer, or may not be provided with the black matrix layer and the color filter layer. Correspondingly, a black matrix is formed on the array substrate, or a color filter layer is further formed on the array substrate, thereby obtaining an array substrate of a type of color filter on array (COA). In this case, the image sensors may be disposed in the non-pixel region of the opposite substrate, for example, disposed between the pixel regions corresponding to adjacent pixel units or between the pixel regions corresponding to adjacent sub-pixel units, for example, the image sensors may be disposed corresponding to the black matrix formed on the array substrate. All of the above arrangements can realize the under-screen texture recognition function without affecting the display effect of the liquid crystal display device.

For example, in some embodiments, the light source array also serves as a backlight source of the light valve structure. For example, in the case where the light valve structure is the liquid crystal panel, as illustrated in FIG. 4, the liquid crystal display device further includes a backlight source 170 including a plurality of second sub-light sources 171 arranged in an array. In the case, the plurality of second sub-light sources 171 arranged in an array also serve as the sub-light sources 101 of the light source array. Thus, the structure of the liquid crystal display device is simplified.

Figure 5:
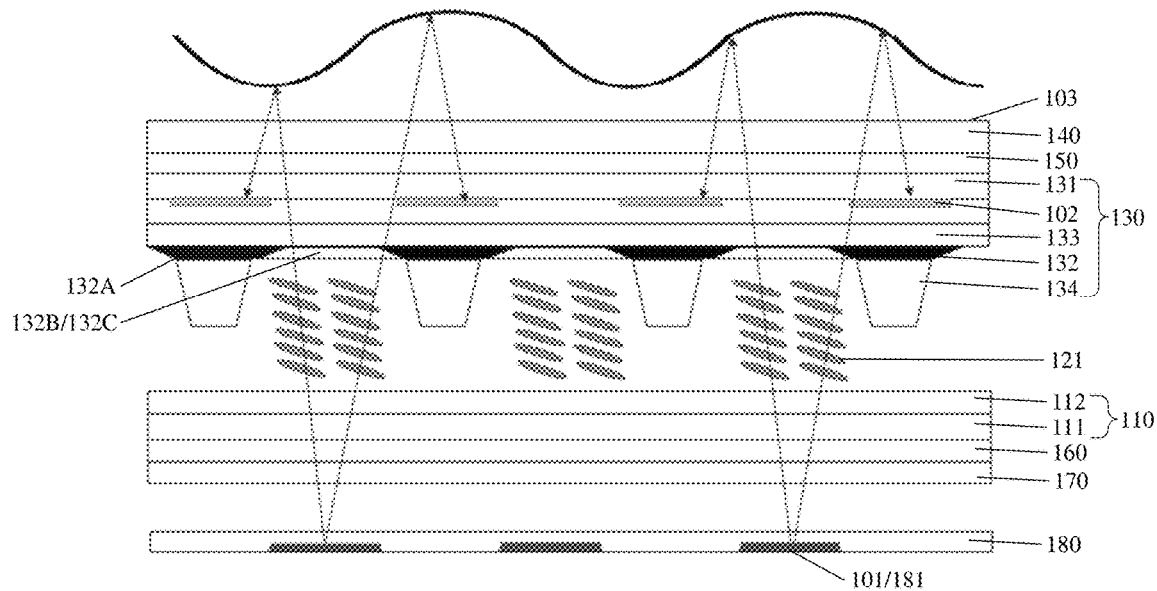
FIG. 5 is another schematic cross-sectional view of a liquid crystal display device provided by at least one embodiment of the present disclosure.

For example, in other embodiments, the texture recognition device further includes a second light source array that serves as the backlight source of the light valve structure. For example, in the case where the light valve structure is the liquid crystal panel, as illustrated in FIG. 5, the liquid crystal display device further includes a backlight source 180 including a plurality of second sub-light sources 181 arranged in an array. In the case, the backlight source 180 is configured to provide backlight for display for the liquid crystal display device, and the light source array is configured to provide the photosensitive light source for the texture recognition for the liquid crystal display device.

For example, the backlight source 170/180 is disposed on a non-display side of the liquid crystal panel and is configured to provide a planar light source for the liquid crystal panel. For example, the backlight source 170/180 is a direct type backlight source, which may further includes a diffuser plate (not illustrated) as required. Light emitted from the second sub-light sources 171/181 is homogenized by the diffuser plate and then enters the liquid crystal panel for display.

For example, the second sub-light sources 171/181 are light emitting diodes (LED). For example, in the backlight source 170/180, the plurality of second sub-light sources 171/181 are arranged in an array, and may be divided into a plurality of regions to be controlled, or may be independently controlled respectively. For example, the direct backlight source may be controlled by combining the local dimming (LD) technology, thereby improving the display quality of the display device. The local dimming technology is to divide the entire backlight source into a plurality of backlight regions which can be driven independently, and each backlight region comprises one or more LEDs. The driving currents of the LEDs of the backlight regions corresponding to different parts of the display image are automatically adjusted according to the gray scale required to be displayed for the different parts of the display image, so that the brightness of each region in the backlight source can be adjusted independently, and thus the contrast of the display image can be improved. For example, the local dimming of the backlight source may be realized by a control circuit.

For example, the plurality of sub-light sources 101 are also light emitting diodes (LED), and the plurality of sub-light sources 101 may also be divided into a plurality of regions to be controlled, or may be independently controlled respectively. For example, the light emitting states of the plurality of sub-light sources 101 of the light source array may also be controlled by combining the local dimming (LD) technology, so as to control the light source array to provide the photosensitive light source in a certain shape, such as a point light source, a line light source or a patterned light source. For example, the light source array is configured to allow one sub-light source 101 or a plurality of sub-light sources 101 arranged continuously to be lit, so as to form the first photosensitive light source.

It should be noted that, for example, the liquid crystal panel may include other functional structures besides the pixel unit array. For example, as illustrated in FIG. 4 and FIG. 5, the array substrate includes a second base substrate 111 and a driving circuit layer 112 on the second base substrate 111, the driving circuit layer 112 includes driving circuits for driving each pixel unit, and signal lines (including gate lines, data lines, detection lines, etc.) for supplying electrical signals (including scanning signals, data signals, detection signals, etc.), etc. For example, the array substrate further includes a first polarizer 160 disposed on a side, away from the driving circuit layer 112, of the second base substrate 111, and the opposite substrate further includes a second polarizer 150 disposed on a side, away from the image sensor, of the base substrate 131, the polarization direction of the first polarizer 160 and the polarization direction of the second polarizer 150 are perpendicular to each other. The liquid crystal material of the liquid crystal layer is deflected under the drive of an electric field, and the transmittance of light is controlled under the cooperation of the first polarizer 160 and the second polarizer 150, thereby realizing gray scale display. For example, the opposite substrate further includes an insulation layer 133 disposed between the image sensor array and the black matrix layer 132, a spacer 134 disposed on a side, close to the liquid crystal layer, of the black matrix layer 132, and the like. The embodiments of the present disclosure do not specifically limit other structures of the liquid crystal panel.

Figure 7A:
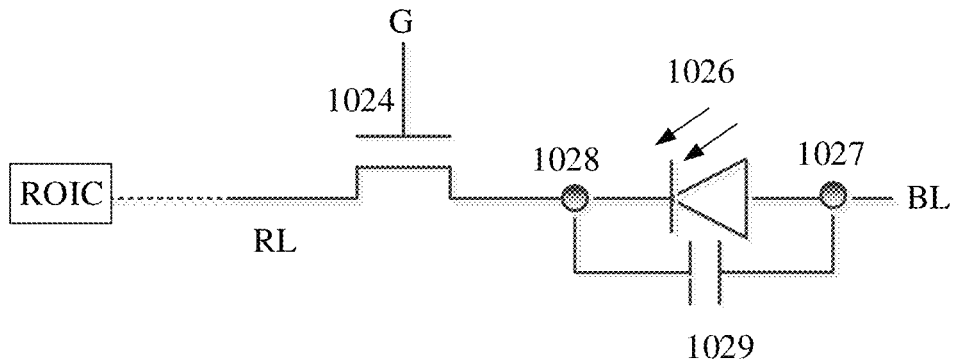
FIG. 7A is a schematic diagram showing a structure and connection relationship of an image sensor in a texture recognition device provided by at least one embodiment of the present disclosure.

For example, the specific structure and the operation process of the image sensor 102 are as follows. For example, FIG. 7A shows a structure and a circuit connection relationship of an exemplary image sensor. As illustrated in FIG. 7A, each image sensor 102 includes a photosensitive component 1026 and a switch component 1024. In some examples, the image sensor 102 may also include a capacitor 1029. A first end (anode end) 1027 of the photosensitive component 1026 is connected to a bias line BL, a second end (cathode end) 1028 of the photosensitive component 1026 is connected to a first electrode of the switch component 1024, a second electrode of the switch component 1024 is connected to a signal readout line RL, a control electrode G of the switch component 1024 is connected to the scanning signal for the image sensor array, and the signal readout line RL is connected to a readout integrated circuit ROIC. A first electrode of the capacitor 1029 is electrically connected to the first end 1027 of the photosensitive component 1026, and a second electrode of the capacitor 1029 is electrically connected to the second end 1028 of the photosensitive component 1026.

The operation process of the above exemplary image sensor including the capacitor 1029 includes the following steps: in a reset stage, the switch component 1024 is turned on by inputting a scanning signal to the control electrode G, the ROIC writes a reset signal to the capacitor 1029 through the switch component 1024 to reset the capacitor 1029, and also reset the photosensitive component 1026; in a photosensitive stage, the switch component 1024 is turned off, the photosensitive component 1026 is in a negative bias state, the photosensitive component 1026 generates photo-generated carriers under the irradiation of reflected light and charges the capacitor 1029, so that the capacitor 1029 generates and stores an electrical signal; in a detection stage, the switch component 1024 is turned on, and the ROIC reads the electrical signal stored by the capacitor 1029 through the switch component 1024, and then a texture image is formed.

Figure 7B:
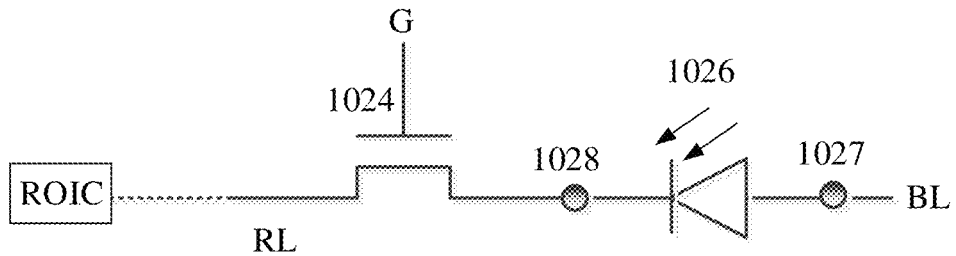
FIG. 7B is another schematic diagram showing a structure and connection relationship of an image sensor in another texture recognition device provided by at least one embodiment of the present disclosure.

FIG. 7B shows a structure and a circuit connection relationship of another exemplary image sensor, and this image sensor does not include a capacitor. The operation process of the exemplary image sensor without a capacitor includes the following steps: in a reset stage, the switch component 1024 is turned on by inputting a scanning signal to the control electrode G, and ROIC writes a reset signal to the cathode of the photosensitive component 1026 through the switch component 1024, so that the photosensitive component 1026 is reset; in a photosensitive stage, the switch component 1024 is turned off, the photosensitive component 1026 is in a negative bias state, and the photosensitive component 1026 generates photo-generated carriers to generate a photo-generated leakage current under the irradiation of reflected light; in a detection stage, the switch component 1024 is turned on, and the ROIC reads an electrical signal corresponding to the photo-generated leakage current through the switch component 1024, and then a texture image is formed.

Figure 8:
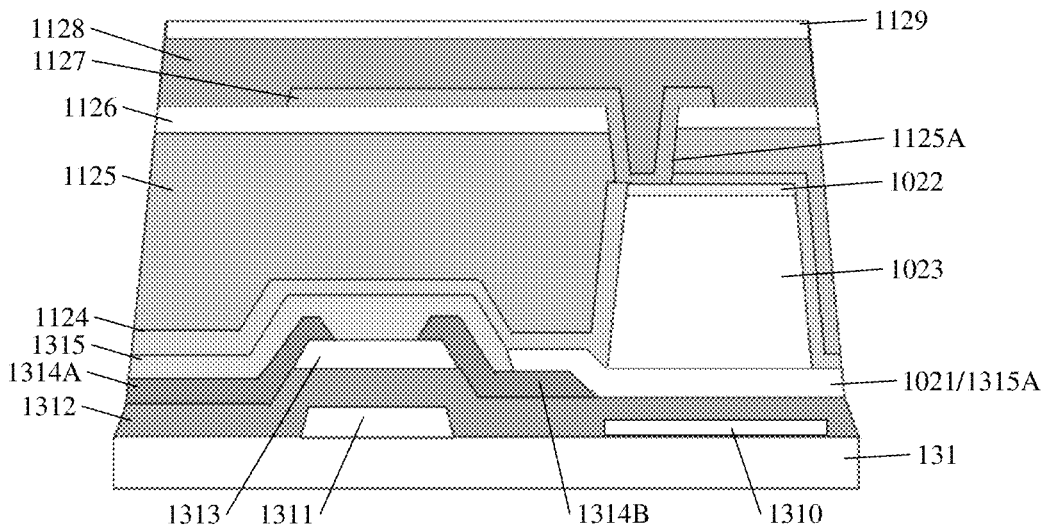
FIG. 8 is a schematic structural diagram of an image sensor provided by at least one embodiment of the present disclosure.

For example, as illustrated in FIG. 8, the photosensitive component of the image sensor may be a photodiode including a first electrode 1021, a second electrode 1022, and a semiconductor layer 1023 between the first electrode 1021 and the second electrode 1022. For example, the photodiode may be of a PN type or a PIN type, etc. In the case where the photodiode is of the PN type, the semiconductor layer 1023 includes a P-type semiconductor layer and an N-type semiconductor layer that are stacked; in the case where the photodiode is of the PIN type, the semiconductor layer 1023 includes a P-type semiconductor layer, an intrinsic semiconductor layer and an N-type semiconductor layer that are stacked. For example, the semiconductor material adopted by the semiconductor layer 1023 may include at least one selected from a group consisting of silicon, germanium, selenium, gallium arsenide, etc., and no limitation is imposed to this in the embodiments of the present disclosure.

For example, as illustrated in FIG. 8, the switch component of the image sensor may be a thin film transistor, such as a monocrystalline silicon thin film transistor, an oxide semiconductor (such as indium gallium tin oxide (IGZO)) thin film transistor, or a polycrystalline silicon thin film transistor (such as a low temperature polycrystalline silicon thin film transistor LTPS-TFT), etc.

For example, in one example, the thin film transistor includes a gate electrode 1311, a gate insulation layer 1312, an active layer 1313, and a source electrode 1314A and a drain electrode 1314B that are sequentially disposed on the base substrate 131. The first electrode 1021 of the photosensitive component is electrically connected to the source electrode 1314A or the drain electrode 1314B (illustrated as drain electrode 1314B in the figure) through a first opening 1315A in the second insulation layer 1315. For example, the photosensitive component is covered by a first insulation layer (including, for example, a protection insulation layer 1124, a planarization layer 1125, and an insulation layer 1126), and a first trace 1127 (e.g., a bias line BL) is electrically connected to the second electrode 1022 of the photosensitive component through a second opening 1125A in the first insulation layer. For example, a shielding layer 1129 is provided on the first trace 1127, and the shielding layer 1129 can play a role of electromagnetic shielding and can avoid signal crosstalk between a texture recognition circuit and a display circuit. The shielding layer 1129 is, for example, a metal layer or a metal oxide layer (e.g., ITO layer) and the like, and no limitation is imposed to this in the embodiments of the present disclosure.

Figure 9:
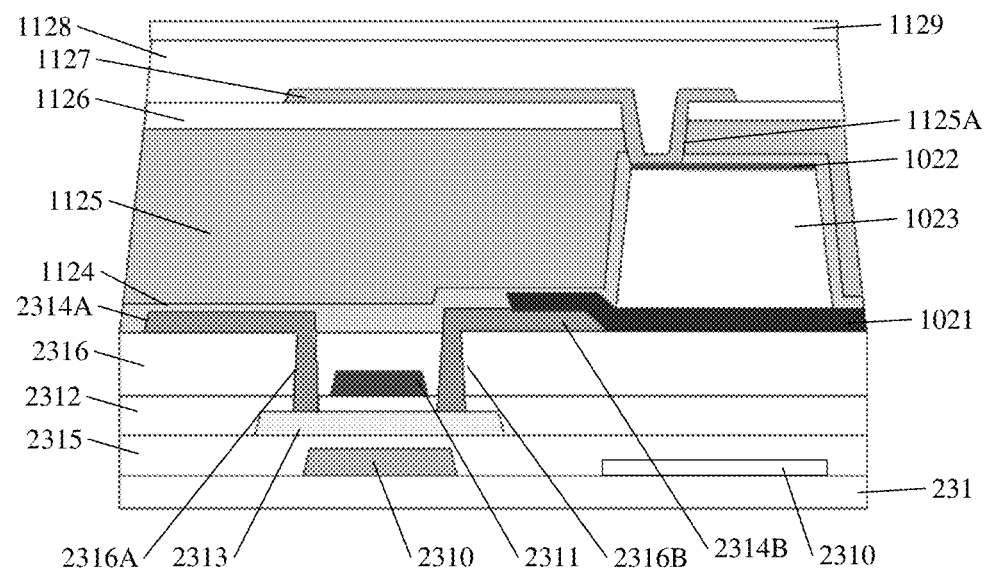
FIG. 9 is a schematic structural diagram of another image sensor provided by at least one embodiment of the present disclosure.

For example, in another example, as illustrated in FIG. 9, the switch component of the image sensor is a thin film transistor with a structure different from that of the thin film transistor illustrated in FIG. 8. For example, as illustrated in FIG. 9, the thin film transistor includes an active layer 2313, a gate insulation layer 2312, a gate electrode 2311, an interlayer insulation layer 2316, and a source electrode 2314A and a drain electrode 2314B that are sequentially disposed on a base substrate 231. The first electrode 1021 of the photosensitive component is electrically connected to the source electrode 2314A or the drain electrode 2314B (illustrated as the drain electrode 2314B in the figure). For example, a light shielding pattern 2310 is provided under the active layer 2313, and an orthographic projection of the light shielding pattern 2310 on the base substrate 131 at least partially overlaps with an orthographic projection of the active layer 2313 on the base substrate 131. The light shielding pattern 2310 can prevent light incident from the base substrate 231 from irradiating the active layer 2313, so as to avoid adverse effects on the operation of the thin film transistor.

It should be noted that the above only exemplifies the structures of two kinds of image sensors, and in other examples, the image sensors may also have other structures (e.g., capacitance, etc.), which are not limited by the embodiments of the present disclosure.

Because in the fingerprint recognition process, besides the light emitted by the light source array can be sensed by the image sensor array, the image sensor array may also sense ambient light incident through the finger. Because the image sensor receives light passively and cannot actively distinguish the light emitted by the light source array from the ambient light, the ambient light may interfere with fingerprint recognition of the image sensor. For example, when the ambient light irradiates right above the finger, the ambient light can pass through the finger and excite biological tissues in the finger to emit pigment light, and the pigment light may interfere with fingerprint recognition. By a detection, the pigment light mainly includes light with a wavelength larger than 600 nm.

For example, as illustrated in FIG. 8, the opposite substrate further comprises a light filter pattern 1310, and the light filter pattern 1310 is configured to filter light with a wavelength larger than 600 nm. For example, the light filter pattern is disposed between the base substrate 131 and the photosensitive component, and an orthographic projection of the photosensitive component on the base substrate 131 at least partially overlaps with an orthographic projection of the light filter pattern 1310 on the base substrate 131. For example, the orthographic projection of the photosensitive component on the base substrate 131 is within the orthographic projection of the light filter pattern 1310 on the base substrate 131.

For example, as illustrated in FIG. 9, the opposite substrate further comprises a light filter pattern 2310, and the light filter pattern 2310 is disposed between the base substrate 231 and the photosensitive component, and an orthographic projection of the photosensitive component on the base substrate 231 at least partially overlaps with an orthographic projection of the light filter pattern 2310 on the base substrate 231. For example, the orthographic projection of the photosensitive component on the base substrate 231 is within the orthographic projection of the light filter pattern 2310 on the base substrate 231.

For example, in FIG. 8 and FIG. 9, the light filter pattern is disposed on a side, close to the image sensor, of the base substrate. In other embodiments, the light filter pattern may be disposed at other positions as long as the function of the light filter pattern can be realized. The embodiments of the present disclosure do not limit the specific position of the light filter pattern.

For example, the light filter pattern 1310/2310 can absorb light with the wavelength larger than 600 nm, thereby the light filter pattern can absorb the ambient light/pigment light, so as to prevent the ambient light/pigment light from irradiating the image sensor array to cause interference to image collection.

For example, the light filter pattern may be formed of an organic resin material, and a colored dye may be doped into the organic resin material to allow the formed light filter pattern to have a certain filtering effect on light with the wavelength larger than 600 nm. The colored dye includes, for example, bromamine acid derivatives and the like. For example, the light filter pattern may also include an inorganic material, and specifically, the light filter pattern may be formed by alternately stacking inorganic layers of titanium oxide ($Ti_3O_5$) with a high refractive index and silicon dioxide ($SiO_2$) with a low refractive index. The embodiments of the present disclosure do not limit the specific material of the light filter pattern.

In the process of the texture collection performed by the texture recognition device 100, the imaging range formed by one photosensitive light source is usually limited. In the case where the area of the texture is large, the imaging range formed by one photosensitive light source may not be sufficient to meet the demand of the texture recognition. In this case, a method of lighting a plurality of photosensitive light sources at the same time or in a time-sharing manner can be adopted to form a plurality of effective imaging ranges, and the effective imaging ranges are superposed and spliced with each other to obtain a larger texture image.

For example, in some embodiments, in the texture collection process of the texture recognition device 100, as illustrated in FIG. 3B, the light valve structure is further configured to control a second region 2 different from the first region 1 to be in a light transmission state, so as to allow light emitted from the light source array to pass through the second region 2 in the light transmission state to form a second photosensitive light source 202. Furthermore, the light valve structure is configured to allow the first region 1 and the second region 2 to be in the light transmission state at the same time or respectively at different time.

Figure 10A:
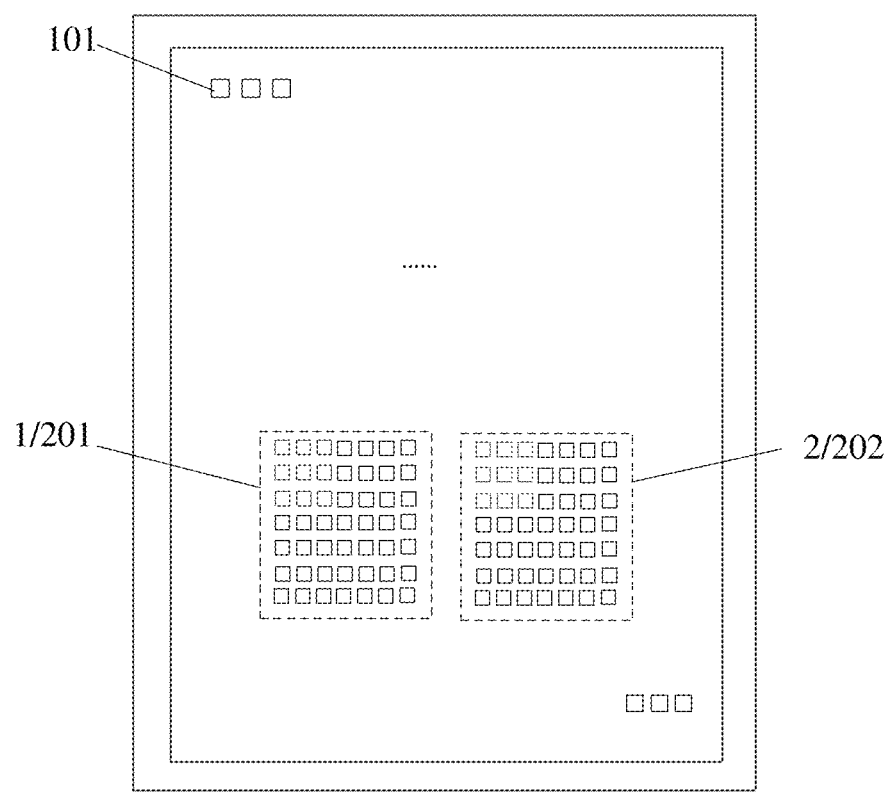
FIG. 10A is a schematic diagram of a photosensitive light source formed by a liquid crystal display device provided by at least one embodiment of the present disclosure.

For example, the size of the second region 2 is equal to the size of the first region 1. For example, as illustrated in FIG. 10A, in the case where the texture recognition device 100 is the liquid crystal display device, the number of the pixel units (or sub-pixel units) corresponding to the second region 2 is equal to the number of the pixel units (or sub-pixel units) corresponding to the first region 1. For example, each of the first photosensitive light source 201 and the second photosensitive light source 202 corresponds to a plurality of pixel units arranged continuously to form a point photosensitive light source. For example, each of the first photosensitive light source 201 and the second photosensitive light source 202 corresponds to 6×6 pixel units arranged in an array, or 7×7 pixel units arranged in an array, 8×8 pixel units arranged in an array, or the like.

Figure 10B:
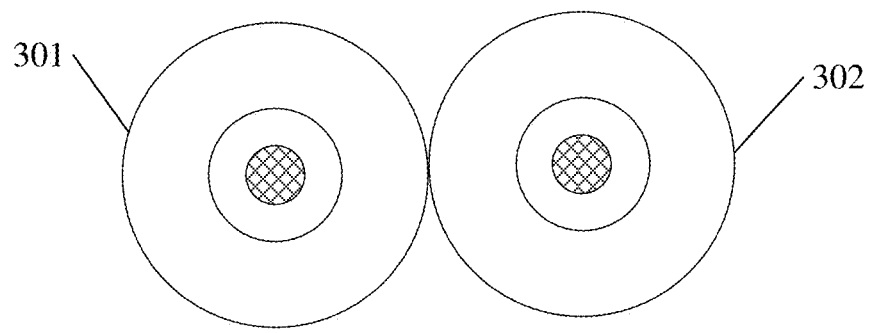
FIG. 10B is a schematic diagram of an imaging range of the photosensitive light source in FIG. 10A.

For example, in one example, in the case that the first region 1 and the second region 2 are in the light transmission state at the same time, as illustrated in FIG. 10B, an imaging range of the first photosensitive light source 201 on the image sensor array is in a first ring shape 301, an imaging range of the second photosensitive light source 202 on the image sensor array is in a second ring shape 302, and the first ring shape 301 is tangent to the second ring shape 302. Therefore, the effective imaging range of the first photosensitive light source 201 and the effective imaging range of the second photosensitive light source 202 can be jointly used for imaging the texture. For example, in some examples, the number of the photosensitive light sources that are lit at the same time may be more, such as four, six, eight, etc. The imaging ranges of these photosensitive light sources on the image sensor array are tangent in sequence, so as to be jointly used for imaging the texture.

Figure 10C:
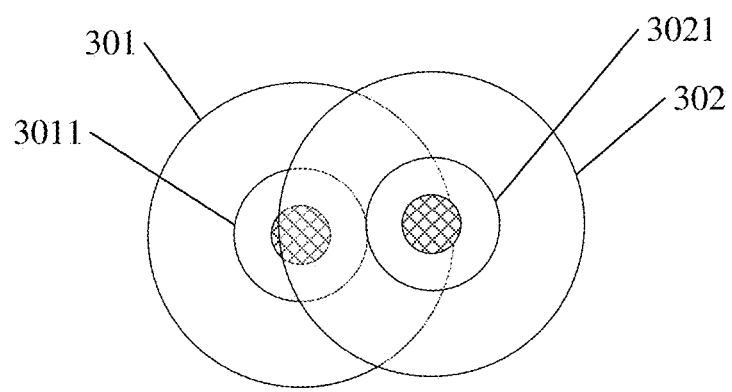
FIG. 10C is a schematic diagram of another imaging range of the photosensitive light source in FIG. 10A.

For example, in another example, in the case that the first region 1 and the second region 2 are in the light transmission state respectively at different time, and for example, in the case that the first region 1 is in the light transmission state at the first time and the second region 2 is in the light transmission state at the second time different from the first time, as illustrated in FIG. 10C, the imaging range of the first photosensitive light source 201 on the image sensor array is in a first ring shape 301, the imaging range of the second photosensitive light source 202 on the image sensor array is in a second ring shape 302, and the second ring shape 302 covers a ring center 3011 of the first ring shape 301. In this case, the first ring shape 301 also covers a ring center 3021 of the second ring shape 302. Because the ring center 3011 and the ring center 3021 are respectively invalid imaging regions of the first photosensitive light source 201 and the second photosensitive light source 202, the effective imaging range of the first photosensitive light source 201 and the effective imaging range of the second photosensitive light source 202 can complement each other, so that the effective imaging range of the first photosensitive light source 201 and the effective imaging range of the second photosensitive light source 202 can be superimposed and spliced with each other to obtain a larger imaging range.

Figure 11:
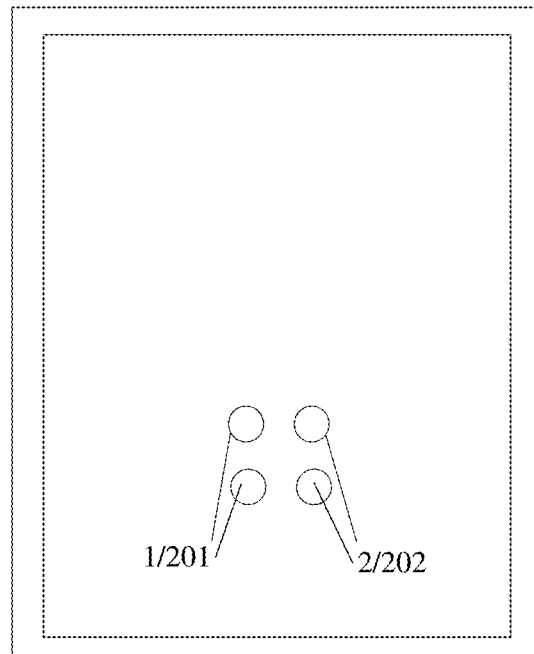
FIG. 11 is a schematic diagram of photosensitive light sources arranged in an array formed by a texture recognition device provided by at least one embodiment of the present disclosure.

For example, in some embodiments, in the case where the size of the texture is large, as illustrated in FIG. 11, the light valve structure may also be configured to allow a plurality of first regions 1 arranged in an array to transmit light at the first time to form a plurality of the first photosensitive light sources 201 (two illustrated in the figure) arranged in an array, and to allow a plurality of second regions 2 arranged in an array to transmit light at the second time to form a plurality of second photosensitive light sources 202 (two illustrated in the figure) arranged in an array, so that the imaging ranges of these photosensitive light sources may be superimposed and spliced to form a larger imaging range. For example, in other embodiments, according to situations (for example, the size of the texture, etc.), more first photosensitive light sources 201 and more second photosensitive light sources 202 may be provided, which is not limited in the embodiments of the present disclosure.

For example, the controller 104 detects a contact area between the texture and the touch side through the touch structure, and when the contact area is larger than a threshold area, the light valve structure performs the above operation. For example, the threshold area may be set according to the operator (e.g., finger) providing the texture. For example, the threshold area may be set to 1 cm×1 cm, etc., which is not limited in the embodiments of the present disclosure. Therefore, the texture recognition device 100 can selectively provide a photosensitive light source according to the contact area of the texture, so as to obtain a texture image of a corresponding size, which facilitates the texture recognition.

It should be noted that the above embodiments are described by taking the case that the photosensitive light source is the point light source as an example. In other embodiments, the photosensitive light source may also be a line light source or other patterned light sources, and the embodiments of the present disclosure are not specifically limited in this aspect. In addition, the point photosensitive light source can be obtained by adjusting the shape of the light transmission region (the first region 1, the second region 2, etc.), for example, the light transmission region may be in an approximately square shape, in an approximately circular shape, and in some cases, the light transmission region may also be formed into an irregular pattern, which is not specifically limited in the embodiments of the present disclosure.

In addition, in the embodiments of the present disclosure, the controller 104 may be various types of controllers, such as various types of integrated circuit chips with processing functions, which have various computing architectures, such as a complex instruction set computer (CISC) architecture, a reduced instruction set computer (RISC) architecture, or a structure that implements various instruction set combinations. In some embodiments, the controller 104 may be a microprocessor, such as an X86 processor or an ARM processor, or may be a digital processor (DSP) or the like. The embodiments of the present disclosure do not limit the type of the controller 104.

For example, in some embodiments, the controller 104 may further include a memory, and the memory is configured to store a control program for forming the light transmission region by time sharing, a control program for forming a plurality of light transmission regions at the same time or by time sharing, and the like. For example, the memory may be any form of storage medium, such as a volatile memory or a nonvolatile memory, a semiconductor memory or a magnetic medium memory, and so on, and no limitation is imposed to this in the embodiments of the present disclosure.

At least one embodiment of the present disclosure further provides a manufacturing method of a texture recognition device, the texture recognition device has a touch side, and the manufacturing method comprises: providing a light source array; providing a light valve structure on a side, close to the touch side, of the light source array, in which the light valve structure comprises a first substrate, a second substrate, and a light adjustment layer between the first substrate and the second substrate, and the light valve structure is configured to control a first region to be in a light transmission state in response to a control signal, so as to allow light emitted from the light source array to pass through the first region in the light transmission state to form a first photosensitive light source; and providing an image sensor array, in which the image sensor array is configured to receive light emitted from the light source array and then reflected to the image sensor array by a texture for a texture collection. For example, in the light valve structure, the second substrate is closer to the touch side than the first substrate, and the image sensor array is on the second substrate.

Figure 12:
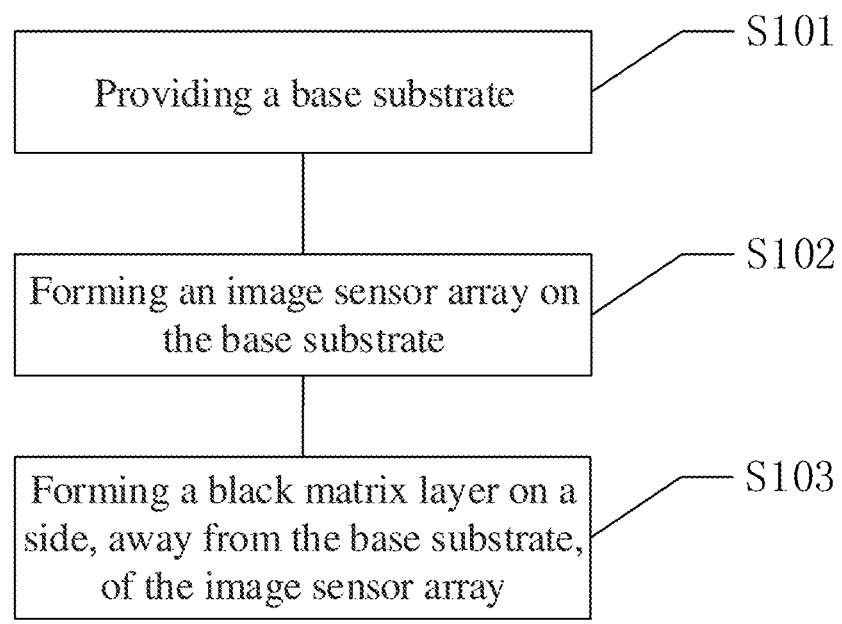
FIG. 12 is a manufacturing flow chart of an opposite substrates provided by at least one embodiment of the present disclosure.

For example, in some embodiments, the light valve structure is a liquid crystal panel, the first substrate is an array substrate, the second substrate is an opposite substrate, and the light adjustment layer comprises a liquid crystal layer. The step of providing the light valve structure comprises forming the opposite substrate of the liquid crystal panel, and as illustrated in FIG. 12, forming the opposite substrate comprises the steps S101-S103.

Step S101: providing a base substrate.

For example, the base substrate may be a transparent substrate such as a glass substrate or a plastic substrate, and the embodiments of the present disclosure do not limit the specific type of the base substrate.

Step S102: forming an image sensor array on the base substrate.

For example, the image sensor array comprises a plurality of image sensors, each of the plurality of image sensors comprises a photosensitive component and a switch component. For example, forming the image sensors comprises: forming the switch component on the base substrate and forming the photosensitive component on the switch component.

For example, each functional pattern of the switch component and the photosensitive component may be sequentially formed by patterning processes. For example, the patterning processes may be photolithographic processes, including forming a material layer to be etched, coating photoresist, exposure, development, etching the material layer to be etched, and so on. For example, the material layer to be etched can be formed by a method such as evaporation, sputtering, ink jet printing, coating and the like according to the properties of the material.

For example, referring to FIG. 8 and FIG. 9, forming the photosensitive component on the switch component comprises: sequentially forming a first electrode 1021 of the photosensitive component, a semiconductor layer 1022 of the photosensitive component and a second electrode 1021 of the photosensitive component, in which the first electrode is electrically connected to a source electrode of the switch component or a drain electrode of the switch component; forming a first insulation layer (for example, including a protection insulation layer 1124, a planarization layer 1125, and an insulation layer 1126) to cover the switch component, in which the first insulation layer comprises a first opening 1125A exposing the second electrode 1023; and forming a first trace 1127 on the first insulation layer, in which the first trace 1127 is, for example, a bias line BL, and the first trace 1127 is electrically connected to the second electrode 1023 through the first opening 1125A.

For example, a material of the protection insulation layer 1124, a material of the planarization layer 1125, and a material of the insulation layer 1126 may be respectively an inorganic insulation material, an organic insulation material, and an inorganic insulation material, so as to provide protection for the switch component and the photosensitive component, and planarize the switch component and the photosensitive component.

For example, the manufacturing method provided in this embodiment further includes: forming a shielding layer 1129 on the photosensitive component, and forming an insulation layer 1128 between the shielding layer 1129 and the first trace 1127. The shielding layer 1129 can play a role of electromagnetic shielding, so as to avoid signal crosstalk between a texture recognition circuit and a display circuit.

For example, the switch component is a monocrystalline silicon thin film transistor, an oxide semiconductor thin film transistor, or a polycrystalline silicon thin film transistor (e.g., a low temperature polycrystalline silicon thin film transistor LTPS-TFT), etc.

For example, in one example, referring to FIG. 8, forming the switch component comprises: sequentially forming a gate electrode 1311, a gate insulation layer 1312, an active layer 1313, a source electrode 1314A and a drain electrode 1314B of a switch transistor on the base substrate 131, and then forming a second insulation layer 1315, in which the second insulation layer 1315 comprises a second opening 1315A exposing the source electrode 1314A or the drain electrode 1314B (the figure shows the case that the second opening 1315A exposes the drain electrode 1314B), and the first electrode 1021 of the photosensitive component is electrically connected to the source electrode or the drain electrode (illustrated as the drain electrode 1314B in the figure) through the second opening 1315A. The manufacturing process can be used, for example, to form the monocrystalline silicon thin film transistor or the oxide semiconductor thin film transistor.

For example, in another example, referring to FIG. 9, forming the switch component comprises: sequentially forming a shielding pattern 2310 and a buffer layer 2315 on the base substrate 231, in which the buffer layer 2315 covers the shielding pattern 2310. Then, an active layer 2313, a gate insulation layer 2312, a gate electrode 2311, an interlayer insulation layer 2316, a source electrode 2314A and a drain electrode 2314B of a switch transistor are sequentially formed on the buffer layer 2315. The gate insulation layer 2312 and the interlayer insulation layer 2316 are provided with a first via hole 2316A and a second via hole 2316B which expose the active layer 2313, the source electrode 2314A and the drain electrode 2314B are electrically connected to the active layer 2313 respectively through the first via hole 2316A and the second via hole 2316B, and an orthographic projection of the active layer 2313 on the base substrate at least partially overlaps with an orthographic projection of the shielding pattern 2310 on the base substrate. The first electrode 1021 of the photosensitive component is electrically connected to the source electrode 2314A or the drain electrode 2314B, and the figure shows the case that the first electrode 1021 of the photosensitive component is electrically connected to the drain electrode 2314B. The manufacturing process can be used, for example, to form the polysilicon thin film transistor, such as the low temperature polysilicon thin film transistor LTPS-TFT.

Step S103: forming a black matrix layer on a side, away from the base substrate, of the image sensor array.

For example, referring to FIG. 4, forming the black matrix layer 132 comprises: forming a black material layer on a base component, and patterning the black material layer to form a shielding region 132A and a plurality of opening regions 132B respectively exposing a plurality of sub-pixel units of the liquid crystal panel, in which the shielding region 132A is formed to cover the image sensor array. The black material layer is made of, for example, a resin material mixed with carbon black or a dark metal oxide.

For example, forming the opposite substrate of the liquid crystal panel further includes forming a color filter layer. For example, the color filter layer is formed in the same layer as the black matrix layer. The color filter layer includes a plurality of color filter patterns 132C arranged in an array, and the plurality of color filter patterns 132C are respectively formed in the plurality of opening regions 132B. The color filter layer is made of, for example, a color resin layer.

For example, an insulation layer 133 is formed between the black matrix layer 132 and the image sensor array. For example, the insulation layer 133 is formed on a side, close to the black matrix layer 132, of the shielding layer 1129.

It should be noted that the materials of each insulation layer provided in the embodiments of the present disclosure, such as the gate insulation layer, the interlayer insulation layer, etc., may be inorganic insulation materials (such as silicon oxide, silicon nitride, silicon oxynitride, etc.) or organic insulation materials (such as resin materials such as polyimide, etc.). The materials of the electrodes provided in the embodiments of the present disclosure, such as the gate electrode, the source electrode, the drain electrode, and the first electrode and the second electrode of the photosensitive component, etc., may be metal materials (e.g., copper, aluminum, titanium, etc.), alloy materials (e.g., alloys of copper, aluminum, titanium, etc.), or metal oxides (e.g., ITO, IZO), etc. For example, the black matrix layer 132 and the color filter layer may adopt resin materials as base materials, and the resin materials are respectively doped with corresponding colored dyes to form the corresponding colors. The embodiments of the present disclosure do not limit the specific material of each function layer.

In addition, in some embodiments of the present disclosure, providing the light valve structure may further include the steps of forming the array substrate of the liquid crystal panel and assembling the array substrate with the opposite substrate to form a liquid crystal cell, etc. These steps may be referred to conventional techniques, and the embodiments of the present disclosure are not limited in this aspect.

Figure 13:
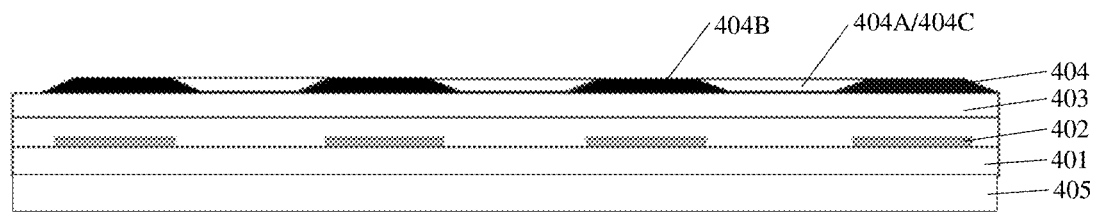
FIG. 13 is a schematic diagram of a color filter substrate provided by at least one embodiment of the present disclosure.

At least one embodiment of the present disclosure further provides a color filter substrate, and the color filter substrate can be used, for example, for a liquid crystal display panel, an electronic paper display panel, etc. As illustrated in FIG. 13, the color filter substrate comprises a base substrate 401, a color filter layer 404 and an image sensor array 402. The image sensor array 402 comprises a plurality of image sensors, and is configured to receive light emitted from a light source array and then reflected to the image sensor array 402 by a texture for a texture collection. The color filter layer 404 comprises a plurality of color filter patterns 404A arranged in an array, the image sensor array 402 comprises a plurality of image sensors, and an orthographic projection of each of the image sensors on the base substrate 401 is within an orthographic projection of an interval between adjacent color filter patterns 404A on the base substrate 401.

For example, in some embodiments, the color filter substrate further comprises a black matrix layer. For example, the black matrix layer is in the same layer as the color filter layer 404, the black matrix layer comprises a shielding region 404B and a plurality of opening regions 404C arranged in an array, and the plurality of color filter patterns 404A are respectively in the plurality of opening regions 404C, so that an orthographic projection of each of the plurality of image sensors on the base substrate 401 is within an orthographic projection of the shielding region 404B on the base substrate 401. The image sensor array 402 is between the base substrate 401 and the shielding region 404B.

For example, in some embodiments, the color filter substrate further comprises an insulation layer 403, and the insulation layer 403 is disposed between the image sensor array 402 and the color filter layer 404.

For example, in some embodiments, the color filter substrate further includes a touch structure 405. For example, the touch structure 405 may be disposed on a side, away from the image sensor array, of the base substrate 401. For example, the touch structure 405 includes a plurality of touch electrodes, for example, the touch structure 405 is implemented as a touch structure of the self-capacitance type or a touch structure of the mutual capacitance type. For example, in the case where the touch structure is of the self-capacitance type, the touch structure includes a plurality of block touch electrodes arranged in an array; in the case where the touch control structure is of the mutual capacitance type, the touch control structure includes a plurality of strip-shaped drive electrodes and strip-shaped sense electrodes which are arranged crosswise. The embodiments of the present disclosure do not specifically limit the form and structure of the touch structure.

The color filter substrate can be used, for example, to be assembled with an array substrate to form a display panel, and in the display panel, the image sensor array is integrated in the color filter substrate, so that the under-screen texture recognition function can be realized without affecting the display function of the display panel.

Figure 14:
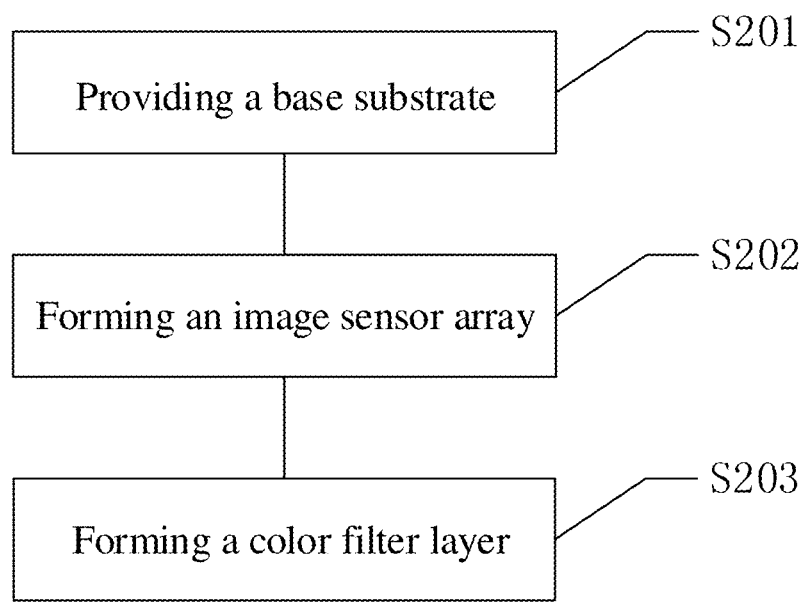
FIG. 14 is a manufacturing flow chart of a color filter substrate provided by at least one embodiment of the present disclosure.

At least one embodiment of the present disclosure provides a manufacturing method of a color filter substrate, as illustrated in FIG. 14, the manufacturing method includes the step S201-step S203.

Step S201: providing a base substrate.

For example, the base substrate is a transparent substrate such as a glass substrate or a plastic substrate, and the embodiments of the present disclosure do not limit the specific type of the base substrate.

Step S202: forming an image sensor array.

The image sensor array is configured to receive light emitted from a light source array and then reflected to the image sensor array by a texture for a texture collection, and the image sensor array comprises a plurality of image sensors.

The specific structure and forming method of the image sensor can be referred to the above embodiments and are not be described here.

Step S203: forming a color filter layer.

The color filter layer comprises a plurality of color filter patterns arranged in an array. An orthographic projection of each of the image sensors on the base substrate is within an orthographic projection of an interval between adjacent color filter patterns of the plurality of color filter patterns on the base substrate.

For example, in some embodiments, the manufacturing method of the color filter substrate may further include forming a black matrix layer.

For example, the black matrix layer is formed in the same layer as the color filter layer, for example, the black matrix layer may be formed before forming the color filter layer. The black matrix layer comprises a shielding region and a plurality of opening regions arranged in an array, and the plurality of color filter patterns are respectively formed in the plurality of opening regions, so that an orthographic projection of each image sensor on the base substrate is within an orthographic projection of the shielding region on the base substrate, and the image sensor array is formed between the base substrate and the shielding region.

The manufacturing method of the color filter substrate combines the manufacturing process of the image sensor with the manufacturing process of the color filter substrate, and the obtained color filter substrate can be used to be assembled with an array substrate to form a display panel, so that the display panel can realize the under-screen texture recognition function.

The following should be noted:

(1) The accompanying drawings involve only the structure(s) in connection with the embodiment(s) of the present disclosure, and other structure(s) can be referred to common design(s).

(2) For clarity, in accompanying drawings for illustrating the embodiment(s) of the present disclosure, the thickness of a layer or a region may be enlarged or reduced. However, it should understood that, in the case in which a component such as a layer, film, region, substrate or the like is referred to be "on" or "under" another component, it may be directly on or under the another component or a component is interposed therebetween.

(3) In case of no conflict, embodiments of the present disclosure and the features in the embodiments may be mutually combined to obtain new embodiments.

What have been described above are only specific implementations of the present disclosure, the protection scope of the present disclosure is not limited thereto. The protection scope of the present disclosure should be based on the protection scope of the claims.

What is claimed is:

1. A texture recognition device, having a touch side, and comprising:
   a light source array;
   a light valve structure on a side, close to the touch side, of the light source array, wherein the light valve structure comprises a first substrate, a second substrate, and a light adjustment layer between the first substrate and the second substrate, and the light valve structure is configured to control a first region to be in a light transmission state in response to a control signal, so as to allow light emitted from the light source array to pass through the first region in the light transmission state to form a first photosensitive light source; and
   an image sensor array configured to receive light emitted from the light source array and then reflected to the image sensor array by a texture for a texture collection, wherein the second substrate of the light valve structure is closer to the touch side than the first substrate, and the image sensor array is on the second substrate.

2. The texture recognition device according to claim 1, wherein the light valve structure comprises a liquid crystal panel, the first substrate is an array substrate, the second substrate is an opposite substrate, and the light adjustment layer comprises a liquid crystal layer;
   the liquid crystal panel comprises a pixel array, the pixel array comprises a plurality of pixel units, the control signal comprises a scanning signal and a data signal, each of the pixel units comprises at least one sub-pixel unit, and each sub-pixel unit is configured to control a light transmission state of a pixel region corresponding to the each sub-pixel unit according to the scanning signal and the data signal.

3. The texture recognition device according to claim 2, wherein the image sensor array comprises a plurality of image sensors, and each of the plurality of image sensors is between pixel regions corresponding to adjacent pixel units of the plurality of pixel units, or
   each of the plurality of image sensors is between pixel regions corresponding to adjacent sub-pixel units.

4. The texture recognition device according to claim 2, wherein the opposite substrate comprises a base substrate and a black matrix layer, and the image sensor array is between the base substrate and the black matrix layer, wherein a side, away from the image sensor array, of the base substrate is closer to the touch side.

5. The texture recognition device according to claim 4, wherein the black matrix layer comprises a shielding region and a plurality of opening regions respectively exposing a plurality of sub-pixel units,
   a color filter pattern is provided in each of the opening regions, and the color filter pattern is configured to form monochromatic light, and
   an orthographic projection of each of the plurality of image sensors on the base substrate is within an orthographic projection of the shielding region on the base substrate.

6. The texture recognition device according to claim 5, wherein the opposite substrate further comprises a light filter pattern, and the light filter pattern is configured to filter light with a wavelength larger than 600 nm;
   each of the image sensors comprises a photosensitive component and a switch component, the light filter pattern is between the base substrate and the photosensitive component, and an orthographic projection of the light filter pattern on the base substrate at least partially overlaps with an orthographic projection of the photosensitive component on the base substrate.

7. The texture recognition device according to claim 1, wherein the light source array also serves as a backlight source of the light valve structure; or
   the texture recognition device further comprises a second light source array, and the second light source array serves as a backlight source of the light valve structure;
   the light source array comprises a plurality of sub-light sources, and is configured to allow one sub-light source or multiple sub-light sources arranged continuously to be lit, so as to form the first photosensitive light source.

8. The texture recognition device according to claim 1, wherein the light valve structure is further configured to control a second region different from the first region to be in a light transmission state, so as to allow light emitted from the light source array to pass through the second region in the light transmission state to form a second photosensitive light source, and is configured to allow the first region and the second region to be in the light transmission state at same time or respectively at different time.

9. The texture recognition device according to claim 8, wherein in a case that the first region and the second region are in the light transmission state at the same time,
   an imaging range of the first photosensitive light source on the image sensor array is in a first ring shape, an imaging range of the second photosensitive light source on the image sensor array is in a second ring shape, and the first ring shape is tangent to the second ring shape, or
   in a case that the first region and the second region are in the light transmission state respectively at different time,
   an imaging range of the first photosensitive light source on the image sensor array is in a first ring shape, an imaging range of the second photosensitive light source on the image sensor array is in a second ring shape, and the second ring shape covers a ring center of the first ring shape.

10. A manufacturing method of a texture recognition device, wherein the texture recognition device has a touch side, and the manufacturing method comprises:
    providing a light source array;
    providing a light valve structure on a side, close to the touch side, of the light source array, wherein the light valve structure comprises a first substrate, a second substrate, and a light adjustment layer between the first substrate and the second substrate, and the light valve structure is configured to control a first region to be in a light transmission state in response to a control signal, so as to allow light emitted from the light source array to pass through the first region in the light transmission state to form a first photosensitive light source; and providing an image sensor array, wherein the image sensor array is configured to receive light emitted from the light source array and then reflected to the image sensor array by a texture for a texture collection, wherein the second substrate is closer to the touch side than the first substrate, and the image sensor array is provided on the second substrate.

11. The manufacturing method according to claim 10, wherein the light valve structure comprises a liquid crystal panel, the first substrate is an array substrate, the second substrate is an opposite substrate, and the light adjustment layer comprises a liquid crystal layer;

providing the light valve structure comprises forming the opposite substrate of the liquid crystal panel, and forming the opposite substrate comprises:

providing a base substrate;

forming the image sensor array on the base substrate; and forming a black matrix layer on a side, away from the base substrate, of the image sensor array.

12. The manufacturing method according to claim 11, wherein forming the black matrix layer comprises:

forming a shielding region and a plurality of opening regions respectively exposing a plurality of sub-pixel units, wherein the shielding region is formed to cover the image sensor array.

13. The manufacturing method according to claim 12, wherein forming the opposite substrate of the liquid crystal panel further comprises: forming a color filter layer, wherein the color filter layer is formed in a same layer as the black matrix layer, the color filter layer comprises a plurality of color filter patterns arranged in an array, and the plurality of color filter patterns are respectively formed in the plurality of opening regions.

14. The manufacturing method according to claim 11, wherein the image sensor array comprises a plurality of image sensors, each of the plurality of image sensors comprises a photosensitive component and a switch component, and forming the image sensor comprises:

forming the switch component on the base substrate and forming the photosensitive component on the switch component;

wherein the switch component comprises a monocrystalline silicon thin film transistor, an oxide semiconductor thin film transistor, or a polycrystalline silicon thin film transistor.

15. The manufacturing method according to claim 14, wherein forming the photosensitive component on the switch component comprises:

sequentially forming a first electrode of the photosensitive component, a semiconductor layer of the photosensitive component and a second electrode of the photosensitive component, wherein the first electrode is electrically connected to a source electrode of the switch component or a drain electrode of the switch component;

forming a first insulation layer to cover the switch component, wherein the first insulation layer comprises a first opening exposing the second electrode; and forming a first trace on the first insulation layer, wherein the first trace is electrically connected to the second electrode through the first opening.

16. The manufacturing method according to claim 15, further comprising: forming a shielding layer on the photosensitive component.

17. The manufacturing method according to claim 15, wherein forming the switch component comprises:

sequentially forming a gate electrode, a gate insulation layer, an active layer, a source electrode and a drain electrode of a switch transistor on the base substrate, and forming a second insulation layer, wherein the second insulation layer comprises a second opening exposing the source electrode or the drain electrode, and the first electrode of the photosensitive component is electrically connected to the source electrode or the drain electrode through the second opening, or forming the switch component comprises:

sequentially forming a shielding pattern and a buffer layer on the base substrate, wherein the buffer layer covers the shielding pattern; and sequentially forming an active layer, a gate insulation layer, a gate electrode, an interlayer insulation layer, a source electrode and a drain electrode of a switch transistor on the buffer layer, wherein the gate insulation layer and the interlayer insulation layer are provided with a first via hole and a second via hole which expose the active layer, the source electrode and the drain electrode are electrically connected to the active layer respectively through the first via hole and the second via hole, and an orthographic projection of the active layer on the base substrate at least partially overlaps with an orthographic projection of the shielding pattern on the base substrate;

wherein the first electrode of the photosensitive component is electrically connected to the source electrode or the drain electrode.

* * * * *